United States Patent [19]

Schultz et al.

[11] Patent Number: 5,006,781
[45] Date of Patent: Apr. 9, 1991

[54] MICROPROCESSOR BASED INTEGRATED GENERATOR SET CONTROLLER APPARATUS AND METHOD

[75] Inventors: Mark H. Schultz, Shoreview; David J. Koenig, Wyoming, both of Minn.

[73] Assignee: Onan Corporation, Minneapolis, Minn.

[21] Appl. No.: 191,560

[22] Filed: May 9, 1988

[51] Int. Cl.⁵ .......................... H02H 7/06; H02P 9/00
[52] U.S. Cl. ........................................ 322/25; 322/28; 307/87
[58] Field of Search ................ 322/25, 28, 15; 307/87

[56] References Cited

U.S. PATENT DOCUMENTS

| | | | |
|---|---|---|---|
| 3,654,484 | 4/1972 | Jorgenson et al. | 307/149 |
| 3,715,652 | 2/1973 | Elliston | 323/268 |
| 4,128,771 | 12/1978 | Domenico | 307/52 |
| 4,280,060 | 7/1981 | Kure-Jensen et al. | 290/40 R |
| 4,322,630 | 3/1982 | Mezera et al. | 290/40 C |
| 4,326,159 | 4/1982 | Aotsu et al. | 322/19 |
| 4,330,743 | 5/1982 | Glennon | 322/10 |
| 4,368,520 | 1/1983 | Hwang et al. | 364/494 |
| 4,403,292 | 9/1983 | Ejzak et al. | 364/492 |
| 4,403,293 | 9/1983 | Bradt et al. | 364/494 |
| 4,438,385 | 3/1984 | Sato et al. | 322/28 |
| 4,438,498 | 3/1984 | Sekel et al. | 364/483 |
| 4,463,306 | 7/1984 | de Mello et al. | 322/25 |
| 4,477,765 | 10/1984 | Glennon et al. | 322/20 |
| 4,481,459 | 11/1984 | Mehl et al. | 322/25 |
| 4,486,801 | 12/1984 | Jackovich et al. | 361/21 |
| 4,498,016 | 2/1985 | Earleson et al. | 290/40 R |
| 4,527,071 | 7/1985 | Ausiello | 290/4 R |
| 4,533,863 | 8/1985 | Luhn et al. | 322/28 |
| 4,538,231 | 8/1985 | Abe et al. | 364/483 |
| 4,550,379 | 10/1985 | Kawai et al. | 364/494 |
| 4,559,487 | 12/1985 | Sims et al. | 322/25 X |
| 4,583,036 | 4/1986 | Morishita et al. | 320/39 |
| 4,593,348 | 6/1986 | Tewesmeier | 363/85 |
| 4,598,373 | 7/1986 | Morishita et al. | 364/424 |
| 4,602,341 | 7/1986 | Gordon et al. | 364/494 |
| 4,617,626 | 10/1986 | Morishita et al. | 364/424.03 |
| 4,651,081 | 3/1987 | Nishimura et al. | 320/64 |
| 4,659,977 | 4/1987 | Kissel et al. | 320/64 |
| 4,670,704 | 6/1987 | Maehara et al. | 322/8 |
| 4,682,097 | 7/1987 | Matsui | 320/64 |
| 4,714,869 | 12/1987 | Onitsuka | 322/20 |
| 4,731,547 | 3/1988 | Alenduff et al. | 307/85 |
| 4,839,575 | 6/1989 | MacFarlane | 322/25 |

FOREIGN PATENT DOCUMENTS 60-16195  1/1985  Japan.
2055262  2/1981  United Kingdom.

OTHER PUBLICATIONS

IEEE *Transactions on Power Systems*, vol. PWRS2, No. 3, Aug., 1987, New York, U.S., pp. 638–644; A. Ghandakly et al., "Digital Controller Design Method for Synchronous Generator Excitation and Stabilizer Systems; Part II: Hardware/Software Design and Implementation Results".

*Electronique Industrielles*, No. 86, Apr. 1, 1985, Paris, FR, pp. 70–73; P. Gorria, "Regulation en Temps Reed d'Une Generatrice Asynchrone".

Primary Examiner—R. J. Hickey
Attorney, Agent, or Firm—Merchant, Gould, Smith, Welter & Schmidt; Merchant, Gould, Smith, Edell, Welter & Schmidt

[57] ABSTRACT

An electrical generator system integrated controller device utilizing PID control and capable of regulating voltage or current, and frequency simultaneously. The device utilizes a micro-controller (30.1) to monitor the engine generator set (20), then determines the appropriate signal to deliver to the electrical generator set (20) to regulate the engine throttle (21) and the generator (22) field windings. The micro-controller (30.1) also provides for real and reactive load sharing with additional generator sets (40) while also providing for an integrated circuit interrupter module (500) to open the line from the generator (22) to the load bus (42). Additionally, serial communications (34) are provided as well as displays (35), meters (37), and operator input (36). Finally, the permissive paralleling module (700) provides that the engine electrical generator set (20) will not be allowed to be connected to the load bus (42) until standards of voltage and phase have been achieved for a set period of time.

18 Claims, 16 Drawing Sheets

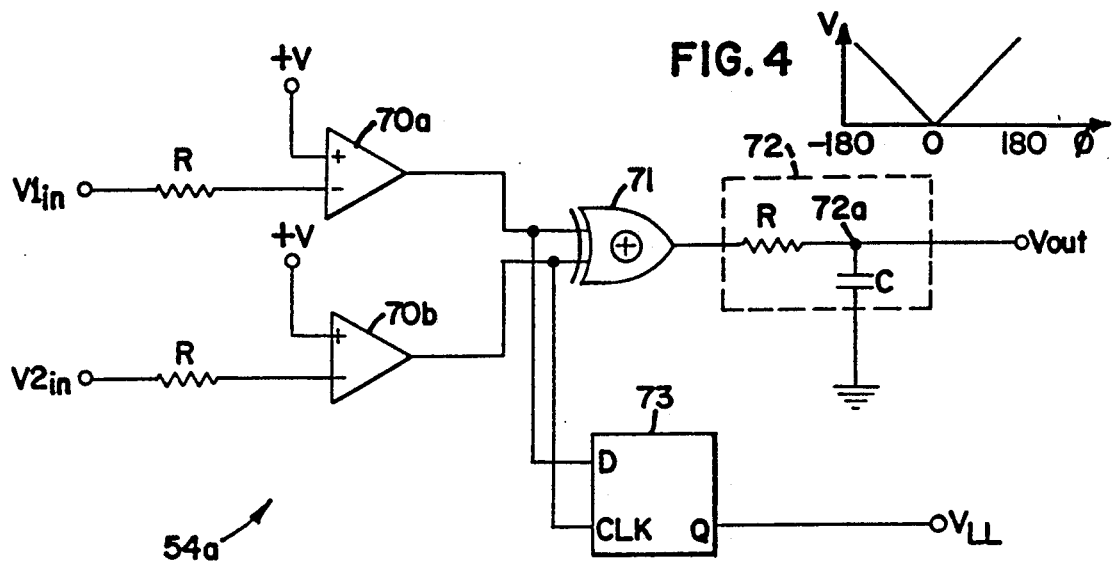
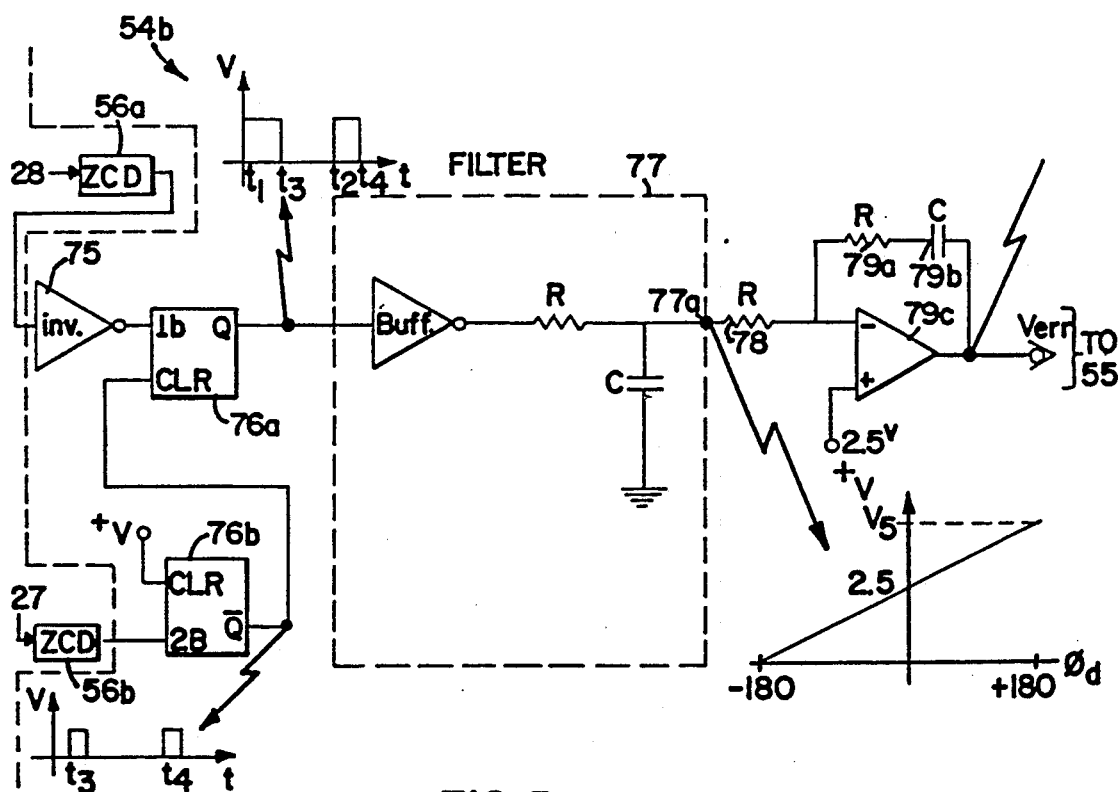
FIG. 4
FIG. 5

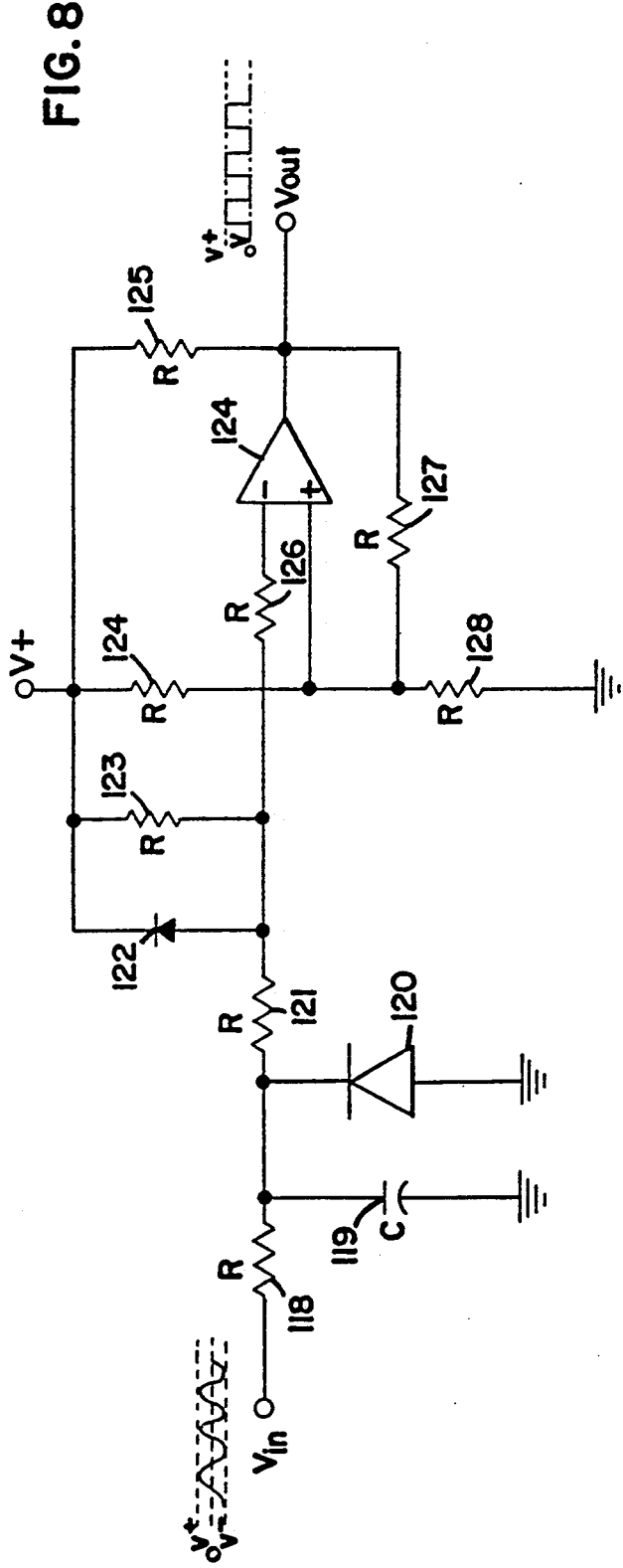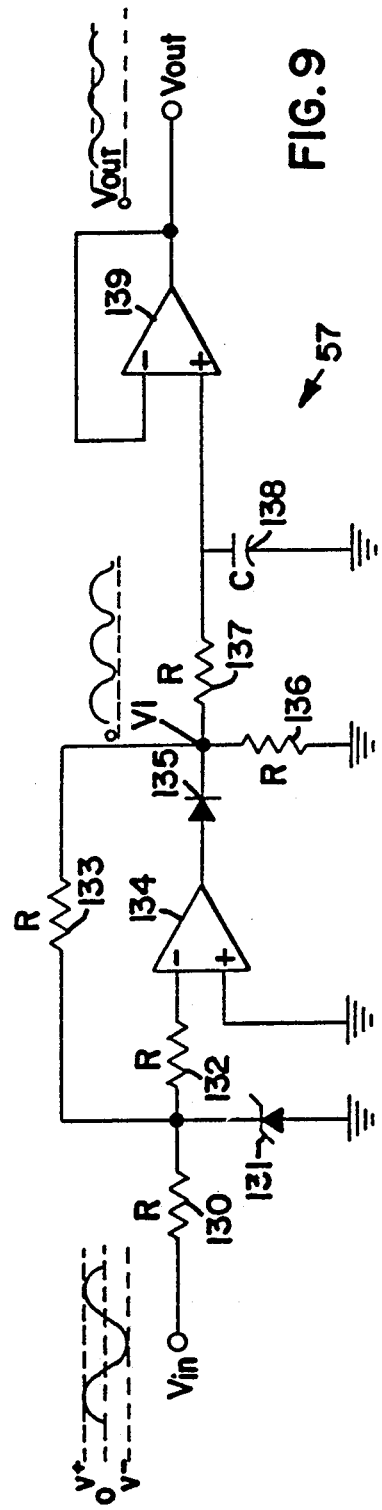
FIG. 8
FIG. 9

INTERRUPTER TRIP CURVE

MICROPROCESSOR BASED INTEGRATED GENERATOR SET CONTROLLER APPARATUS AND METHOD

FIELD OF THE INVENTION

This invention relates generally to a control process system, and more particularly to an improved method and apparatus for controlling an electrical generator.

BACKGROUND OF THE INVENTION

The present invention relates to a microprocessor based, highly integrated generator set controller. More particularly, the present invention relates to an electrical generator set and power system controller capable of sharing real and reactive power with parallel generator sets and further providing for precise frequency, voltage and current regulation while utilizing a single processor. By so doing, system performance, reliability, and cost are optimized.

The output voltage of an electrical generator is determined by the excitation of the field windings of the generator. Therefore, the output voltage of the generator may be controlled in a closed-loop fashion by monitoring its output voltage, comparing that voltage to a reference voltage level, and generating an appropriate signal to the field winding. The speed of the engine driving the generator controls the generator output waveform frequency. Therefore, the freqency of the output waveform may be controlled in a closed-loop fashion by monitoring the revolutions of the engine, comparing the revolutions to a reference and generating an appropriate signal to adjust the engine throttle.

Analog controller systems are widely used in the control of electrical generators. This type of controller typically employs distinct component to independently control the two closed-loop control functions (i.e., the output voltage of the electrical generator and the frequency of the output voltage waveform of the electrical generator). They typiclly do so without sharing information concerning the status of the other closed-loop control function. Further, the circuitry providing for these two control functions are not interconnected to one another. Therefore, in an analog system, not only are the components discrete, but the two control systems are both independent and discete from one another.

Due to their dual discrete design, analog systems also have the disadvantage of requiring duplicate input transformers and circuitry when additional features are added. Also, since the systems are analog, they cannot perform self-diagnostics, indicate their operational state or integrate their control processes to optimize performance. Finally, the discrete controls require calibration for each electrical generator production unit.

There have been attempts to integrate generator set controllers, for example Mezera et al, U.S. Pat. No. 4,322,630, and provide for microprocessor control of the control function. However, none of the attempts have fully integrated the entire generator set control function. Further, none have integrated the precise regulation of fequency, voltage, and current conditions, automatic synchronization of parallel generators, permissive paralleling, and both real and reactive load sharing control during parallel operation. The present invention provides an integrated system and method which provides increased performance over the above described generator set controllers.

SUMMARY OF THE INVENTION

The present invention relates to a highly integrated control system for the monitoring and control of an electrical generator set which hereafter will be referred to as a gen-set for convenience. More specifically, the present invention provides the capability for implementing the following control functions: electronic governor control, automatic voltage regulation, regulated short circuit current, engine speed sensing, engine fault monitor, circuit interrupter control, overload fault, short circuit fault, automatic synchronization, permissive paralleling, over and under voltage faults, remote metering and control, starting aid control, output power calculation and display, reverse power fault, permissive paralleling control, real power load sharing control during parallel operation, reactive power load sharing control during parallel operation, built-in self-diagnostics, and provision for external diagnostics equipment.

The control system includes a microprocessor control unit comprising a central processing unit (CPU), several high speed input-output devices, an eight channel analog to digital converter, an erasable programmable read only memroy (EPROM), a pulse width modulator (PWM), an interrupt control, input/output (I/O) expander chips and a serial port. By way of example, parameters monitored by the control unit include engine speed, generator voltage and current, load bus voltage, engine oil pressure, water temperature, fuel and speed, additional parallel gen-sets, and operator input. By monitoring these signals, comparing the signals to reference levels, and determining the appropriate output according to control equations, the microprocessor controls the operation and output of the engine generator system.

The two main control functions of the integrated controller are the regulation of the engine's revolutions per unit time, which affects the frequency of the generator output waveform, and the regulation of the excitation of the field windings of the generator, which affects the output voltage of the generator. To control these two functions, the microprocessor utilizes two different proportional, integral, derivative control equations which will be referred to herein as PID equations for convenience. The general form of a PID equation in the time domain is as follows:

$$u(t) = K_p E(t) + K_i \int E(t)dt + K_D \frac{dE(t)}{dt}$$

where $K_p$, $K_i$ and $K_D$ are the respective constants for the proportional, integral and derivative terms respectively. The constants for the preferred embodiment of the present system control were derived from the analog compensation networks previously utilized with the gen-set. However, the constants may be derived by determination of the transfer function from the steady-state response or other such methods as are well known in the art. The previous analog compensation network from which the current constants were derived is further described in U.S. Pat. No. 4,533,863 which is incorporated herein by reference.

To convert analog compensation networks to equations which may be utilized by a digital microprocessor, the time domain equations describing the system are converted to the Z-domain using a bilineal transform. The resulting equation are factored and used by the microprocessor as control equation. A thorough discussion of digital control using microprocessors may be found generally in P. Katz, *Digital Control Using Microprocessors*, (1981 Prentice/Hall) which is incorporated herein by reference.

To derive the actual PID control equations for the preferred embodiment from the existing analog compensation network, three steps are performed. First, the transfer function of the analog compensation network is determined. Second, the transfer function is converted to the Z-domain using the bilineal transform:

$$S = \frac{2}{T} \frac{(Z-1)}{(Z+1)}$$

Finally, the resulting equation is converted to a numerical algorithm. To perform this final step, the Z-domain equation may be factored to the following form:

$$D(Z) = \frac{(1 + a_1 Z^{-1})(1 + a_2 Z^{-1})}{(1 + \beta_2 Z^{-1})(1 + \beta_3 Z^{-1})}$$

This equation's coefficients may be shown to correspond to a cascade realization, as is well known in the art (see e.g., Katz at 140, infra). By then defining four constants ($K_1$, $K_2$, $K_3$ and $K_4$) whose values are based on the resistors and capacitors of the analog system, and allowing six variables to be established ($A_1$, $B_1$, $C_1$, $D_1$, $X_1$ and $X_2$) to store the intermediate results required by the algorithm, one may then express the control process algorithm as follows:
if,
 $A = (K_1)(V_1)$
 $B = (K_2)(X_1)$
 $C = (K_3)(X_2)$
 $D = (K_4)(X_2)$
then,
 $X_1 = X_1 + A$
 $X_2 = A + B + C$
 $U_1 = A + B - D$
Where $U_1$ is the output of the algorithm and $V_1$ is the input.

This procedure is similarly utilized to obtain each of the control equation for the gen-set system. The resulting two PID control equations being indentical in form, but utilizing different numerical values for the coefficients. To obtain the numerical values for the voltage regulation PID coefficients during current regulation, quantitative testing was performed to determine best results.

The integrated controller unit includes data processing means for computing sampling rates and values of the various monitored parameters, for solving the control equations, and for comparing the monitored paremeters against fixed values to determine if the measured parameters have exceeded their rated values. The data processing means further include means for comparing the frequency and phase of the main bus voltage and the gen-set's frequency and phase. Fault displays, meters, and serial communication links are also provided. A more complete discussion of the microprocessor used in the preferred embodiment of the present invention may be found in the Intel, *Embedded Controller Handbook*(1988) (copyright 1987) which is hereby incorporated by reference.

Briefly, in operation, a preferred embodiment of the integrated control unit constructed according to the principles of the present invention, samples a regulated phase voltage every two milliseconds. Each one-half millisecond between the two millisecond sample, the control unit samples one of several other analog channels. These channels include the two voltage phases of the generator which are not regulated, the three phase currents of the generator, the phase angles of the voltages and cuurrents produced by the generator, and several other system parameters. The microprocessor utilizes the sample by applying the control process equations, and transmitting an appropriate regulated voltage response signal through a pulse width modulator, resident in the microprocessor, to excite the field windings of the generator.

The frequency of the generator is similarly regulated by the control unit. The monitoring of the frequency is interrupt driven, is asynchronous and occurs after receiving a set number of pulses from a magnetic pickup located on the engine driving the generator. The microprocessor utilizes the sampled engine speed by applying the appropriate control system equation, and transmitting an appropriate signal through a high speed input-output device (resident in the microprocessor) to the governor output stage which controls the engine throttle. In this manner, the generator voltage and frequency of the electric gen-set is controlled by the microprocessor.

Beside integrating the basic gen-set control functions, another feature of the present invention is its ability to switch to a current regulation mode in real time (on-the-fly), during fault conditions. The microprocessor switches from voltage to current regulation whenever the current being drawn from any of the three phases of the gen-set exceeds 300% of the rated current of the generator. During this mode of regulation, the microprocessor changes the voltage regulation PID equation coefficients in order to provide for a better system response, while limiting the output current. The system provides the current regulation on the phase exhibiting the largest output current. This provides for regulating one phase which may have larger loads connected to it than the other phases. During current limiting regulation, the analog channel sampling technique is changed to sample the largest current every two milliseconds, with the other channels being sampled at one-half millisecond intervals as previously described.

Another feature of the present invention is its ability to synchronize the gen-set with the load bus. To synchronize the gen-set, the microprocessor monitors one phase of the load bus voltage. This signal is converted into a square wave by a zero crossing detector and compared to a similar signal generated by a second zero crossing detector whose input is one phase of the gen-set voltage. The comparison is provided by two monostable devices. These devices generate a voltage corresponding to the phase difference between the two voltages. The voltage is then processed by a proportional-integral compensator circuit to provide a signal used by the microprocessor in its governor regulation module to adjust the gen-set frequency to synchronize the gen-set with the bus.

Still another feature of the present invention is the capability to share the load present on the load bus with other gen-sets connected to the bus. When gen-sets are hooked in parallel to a load bus, optimum performance is achieved by providing that each gen-set equally share the real and reactive power drawn by that load. Therefore, provision is made for the controller to calculate the real and reactive power delivered by the gen-set to the load bus from each of the three phases and provide output signals corresponding to the real and reactive power delivered respectively. Other generators in parallel with the load bus also provide similar signals. The signals are compared in an analog manner and correction signals provided back to the controller for both real and reactive power. The correction signals allow the controller to adjust the regulation of the engine to balance real power and adjust the regulation of the field winding excitation to balance reactive power.

Another feature provided is a microprocessor controlled trip curve for both overload and short circuit conditions. These conditions are based on the characteristics of the generator and in part on government specifications. This feature is provided by controlling the circuit interrupter. The interrupter is opened at a given time associated with the amount of current being drawn by the load. When the interrupter is opened, the gen-set is isolated from the load bus thereby removing the overload or short circuit condition.

A further feature is provided to allow for permissive paralleling of gen-set. This featuure provides that the gen-set contactor will not be allowed to close unless the load bus is not energized or two conditions are met for a specific time interval. In a preferred embodiment, first condition is that the phase difference between the gen-set output waveform and the load bus is less than 20 degrees (plus or minus). The second condition is that the voltage difference is less than 8 volts (plus or minus). The requirement that these two conditions be satisfied for a specific time interval avoids allowing the contactor to be closed when the conditions have been met only instantaneously.

An additional feature provides for a reduced gen-set engine speed upon start up. The feature is a "soft start" provision which allows the gen-set to increase its speed from zero revolutions per second up to its normal operative speed over several seconds. There is also provision for a voltage soft start, whereby the exitation of the field windings is limited to provide for an increase of the generator output voltage from zero volts to its normal operative value over several seconds.

The invention also has a voltage load provision, whereby if a heavy load is placed suddenly on the load bus (e.g., when a large electric motor is started) thereby slowing the gen-set engine, then the gen-set voltage is allowed to drop proportionally to the reduction in speed of the gen-set engine. The drop in voltage reduces the load on the engine allowing the frequency to recover to the reference value.

In addition to other features and advantages, the present invention provides a system to control the gen-set, while sensing and protecting from over and under voltage or current fault conditions, and sharing real and reactive loads with additional gen-sets. These and various other advantages and features of novelty which characterize the present invention are pointed out with particularity in the claims annexed hereto and form a further part hereof. However, for a better understanding of the invention, its advantages and objectives obtained by its use, reference should be made to the Drawing which form a further part hereof, and to the accompanying descriptive matter, in which there is illustrated and described a preferred embodiment of the present inveniton.

BRIEF DESCRIPTION OF THE DRAWING

In the Drawing, wherein like reference numerals and letters indicate corresponding elements throughout the several views:

FIG. 4 is a schematic diagram of the phase detector represented by block 54a in FIG. 3;

FIG. 5 is a schematic diagram of the phase detector and PI compensator represented by blocks 54b and 68 in FIG. 3 respectively;

FIG. 8 is a schematic diagram of the zero crossing detectors represented by block 56 and 52 in FIG. 3;

FIG. 9 is a schematic diagram of the precision rectifier and filters represented by block 57 in FIG. 3;

DETAILED DESCRIPTION OF A PREFERRED EMBODIMENT

Figure 1:
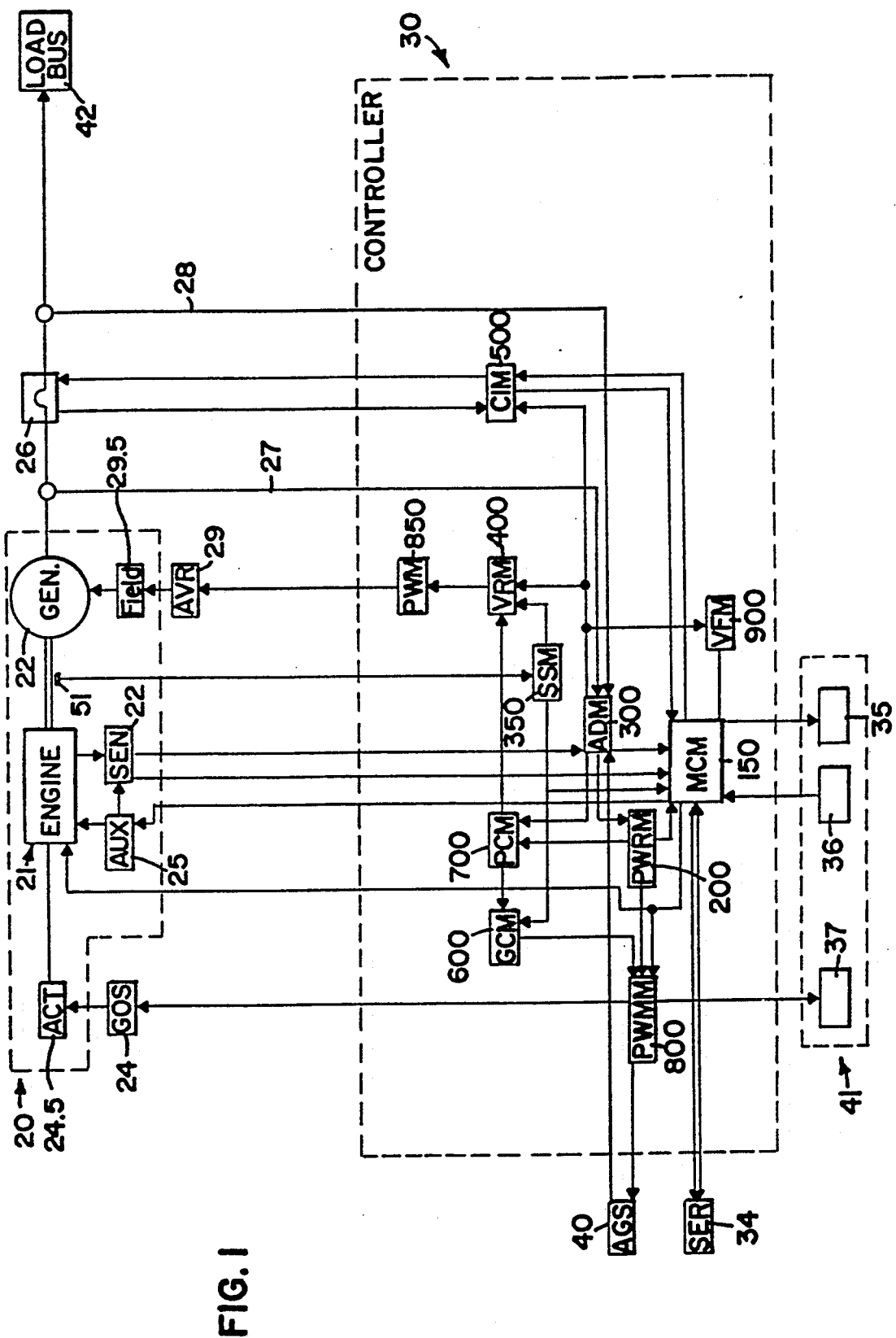
FIG. 1 is a block diagram of an integrated gen-set controller constructed according to the principles of the present invention, wherein lines inside the hatched controller area indicate information flow and the blocks within that area represent modules consisting of logic flow.

Referring now to the FIGURES, there is illustrated an embodiment of a microprocessor based integrated gen-set controller constructed in accordance with the principles of the present invention. The controller system is generally referred to by the reference numeral 30. The engine and electrical generator system, hereinafter referred to as the "gen-set" for convenience, is illustrated in FIG. 1 as including an engine 21 and its corresponding electrical generator 22, which in the preferred embodiment is a three-phase brushless synchronous generator. The generator 22 may be connected in a wye or delta configuration in any number of voltage configurations as is well known in the art. For the purpose of this application, a 120/208 wye connection will be assumed. The generator 22 is mechanically linked to receive rotational energy from engine 21. Engine 21 may take many forms, including using gas, diesel or propane as its source of energy and may conceivably make use of other forms of energy such as wind power or hydroelectric. The engine and generator together forming the gen-set 20 may be considered to have two states. The first state is an "operational" state wherein the engine is producing rotational energy for generator 22 to produce electrical energy. The gen-set 20 may be connected to a load bus 42 for transmitting the produced electrical energy. The second state is an "inhibited" state wherein engine 21 is producing no rotaional energy. In the inhibited state, the generator 22 cannot produce electrical energy.

The various modules and devices of a preferred embodiment constructed according to the principles of the present inveniton will be described in the following order. First, an overview of the information flow between the various logic modules of the controller will be described. Second, an overview of the microprocessor chip used by controller 30 will be presented. Third, a description of the schematics describing the various connections to controller 30 will be set forth. Fourth, the various peripheral circuits utilized in a preferred embodiment will be described. Last, the operation and control of the gen-set 20 by controller 30 will be described through logic flow diagram which may include software resident in controller 30.

First, to describe the information flow between the modules, and referring still to FIG. 1, within the hatched lines of controller 30, there is a governor control module (GCM) 600, having inputs from speed sensing module (SSM) 350 and parallel control module (PCM) 700. SSM 350 receives input from a magnetic pickup 51 located on the engine 21. The pickup 51 produces a sine wave by passing metallic teeth close to a magnetic pickup as is well known in the art. In a preferred embodiment, pickup 51 is designated as model number DYNT-13200, manufactured by Barber Colman. SSM 250 then generates a number based on the input from pickup 51 that is proportional to the rotational speed of gen-set 20. This speed determines the frequency. The number is then sent to GCM 600. GCM 600 calculates the throttle position for engine 21 based in large part on the frequency received from SSM 350 (although PCM 700 may affect this calculation as discussed below).

The throttle position output of GCM 600 is sent to the pulse width modulator module (PWMM) 800 for subsequent output through a high speed input-output device 43 (FIG. 2) resident on controller 30. The signal is sent from the high speed input-output device 43 to the governor output stage 24 which controls the actual throttle position of engine 21 via an actuator 24.5.

Voltage regulator module (VRM) 400 receives its fundamental input from the analog to digital converter module (ADM) 300. ADM 300 monitors the three-phase voltage and current produced by generator 22 via line 27 (shown as only one line for convenience although seven line are used in a preferred embodiment) and provides the voltage and/or current information required by VRM 400. VRM 400 uses the transmitted values as the fundamental information for determining the required output to be delivered to the pulse width modulator (PWM) 850. The automatic voltage regulator (AVR) power stage 29 receives the PWM 850 output. AVR power stage 29 is connected to the field windings 29.5 of generator 22.

Also providing input to VRM 400 is SSM 350. The information provided to VRM 400 by SSM 350 is used during the proportional voltage drop feature of the present invention as will be described below. Further providing input to VRM 400 is the PCM 700. This information is provided to VRM 400 during a paralleling operation as will also be described below.

VRM 400 also provided for regulation of any one of the three-phase currents as will be described below.

As discussed, providing input to FCM 600 and VRM 400 is PCM 700. The PCM's 700 function is to assure that in the event that additional gen-sets (AGS) 40 are connected to the load bus 42, then gen-set 20 will be connected to the load bus 42 only if it is synchronized to the load bus 42. Further, PCM 700 provides for enabling load sharing once circuit interrupter 26 is closed.

PCM 700 also provides for synchronization of the gen-set 20 with the load bus 42. This feature is provided by a voltage monitoring the phase difference between the voltage waveforms on the load bus 42 and gen-set 20.

Figure 19:
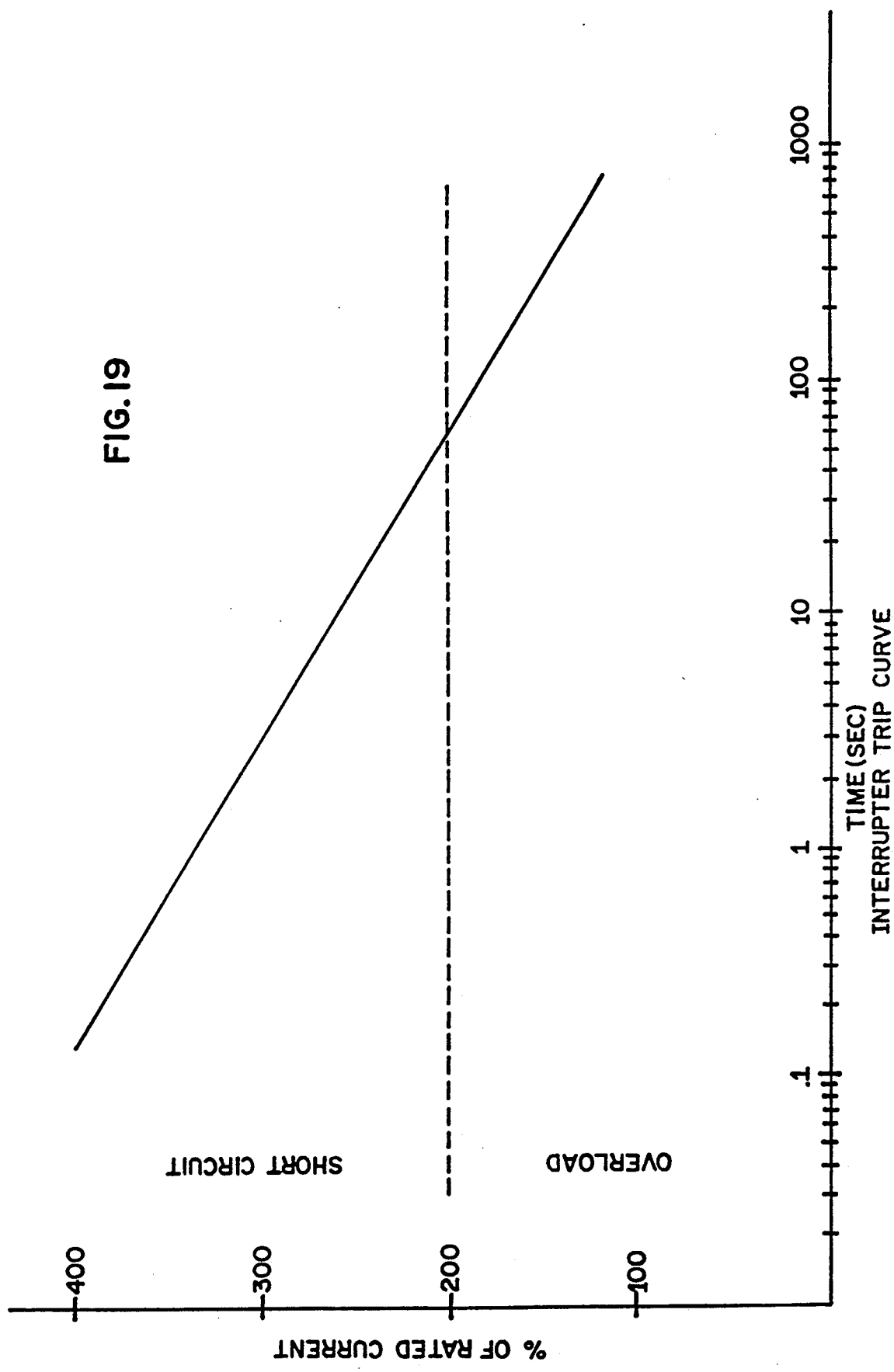
FIG. 19 is a graph in semi-log scale of the relationship between the percentage of rated current being drawn from gen-set 20 versus the time prior to circuit interrupter module 500 opening interrupter 26.

Providing control to circuit interrupter 26 is circuit interrupter module (CIM) 500. Circuit interrupter 26 is an AC contactor. The module both controls the opening and closing of the circuit interrupter 26 as dicated by the various other modules, but also provides for interrupting the generator 22 from the load bus 42 by opening the circuit interrupter 26 in accordance with FIG. 19. By way of example, FIG. 19 illustrates that there is no interruption by circuit interrupter 26 at a current of less than 120% of the generator's 22 rated current. Also, FIG. 19 illustrates that at greater than 400% of rated current, the interrupt occurs immediately. At values between 120% and 400%, the CIM 500 opens interrupter 26 in a time dependent fashion. The values indicated by the trip curve illustrated in FIG. 19 are stored as a look up table by controller 30.

The voltage fault module (VFM) 900 receives input from the ADM 300 regarding the status of the gen-set 20 voltage being produced. This information is in turn provided to the monitor control module (MCM) 150 which is then main working module of controller 30. The MCM 150 receives information from each module described thus far with the exception of the GCM 600 and the VRM 400. It also receives input from a module not yet discussed, that module being the power calculation module (PWRM) 200. The PWRM 200 calculates the real and reactive power being drawn from generator 22 and provides the information to the PCM 700, the PWMM (to drive display meters 37) and the MCM 150.

Controller 30 is also illustrated as capable of supporting serial communication (SER) 34, fault displays 35, operate inputs 36 (typically a cathode ray tube (CRT) device for presentation of system information to an operator and a keyboard for operator input to the controller), and meter drives 37. Controller 30 also can provide starting aid to engine 21 (e.g., glow plugs or the like). In the preferred embodiment controller 30 is an 8097 micro controller chip of the 8096 family of controller chips manufactured by Intel.

Controller 30 is also capable of communicating with AGS 40 and monitoring the load bus 42 to which the generator 22 is connected. Controller 30 is illustrated as monitoring one phase of the bus voltage and phase via line 28.

Lines 27 and 28 are connected to monitoring devices such as ammeters and voltmeters or current and voltage transducers which are well known in the art and which will not be described further.

Second, is a description of the microcontroller portion 30.1 of controller 30.

Figure 2:
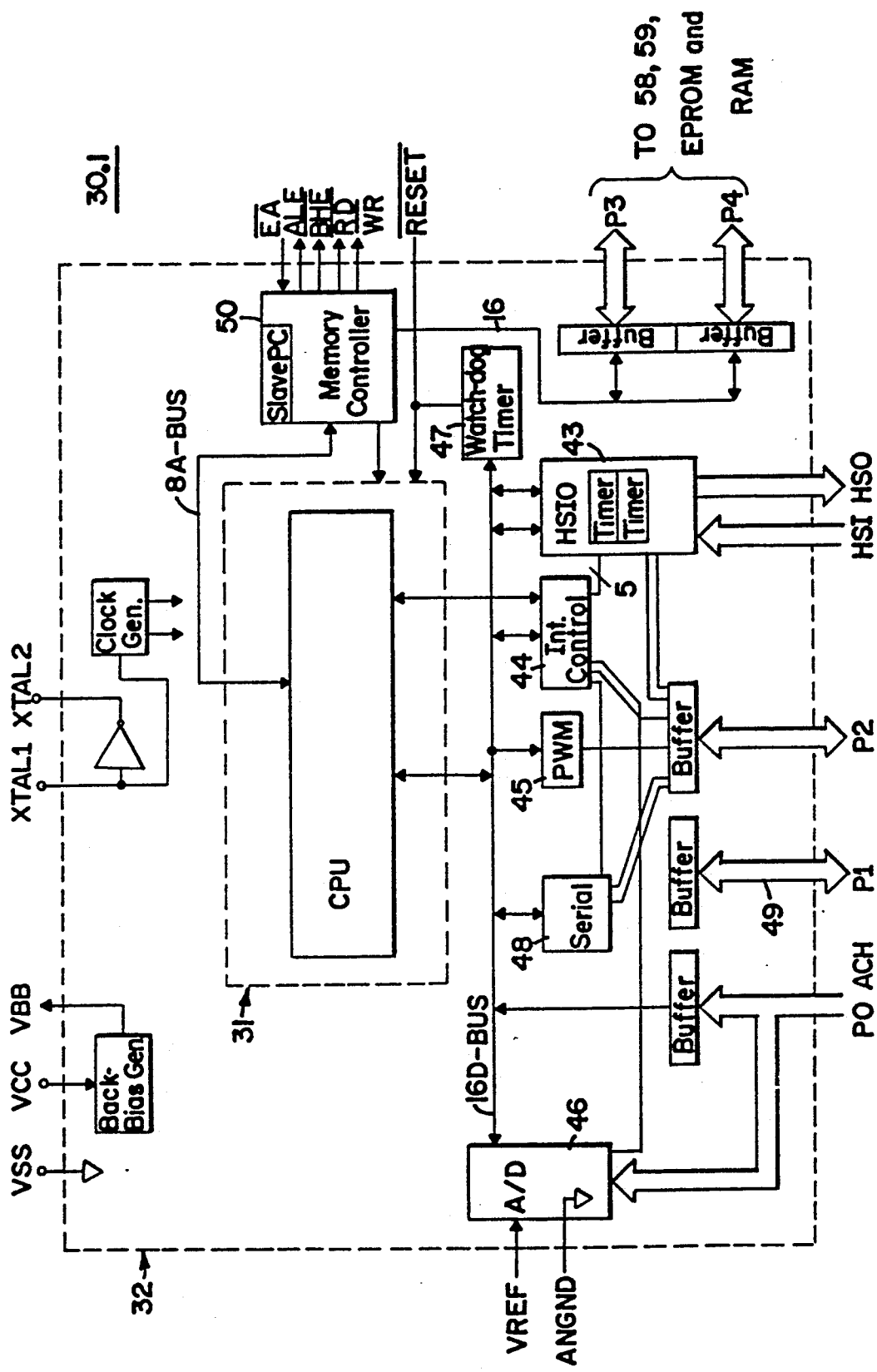
FIG. 2 is a block diagram of the functional characteristics of the microcontroller of the controller represented by block 30 in FIG. 1.

Referring now to FIG. 2, there is illustrated a block diagram of the 8097 microcontroller portion of controller 30 utilized in a preferred embodiment of the present invention. The controller is illustrated generally at 30.1 in FIG. 2. There are two major sections of the microncontroller 30.1. The first is the CPU section designated as 31 and the I/O section designated as 32. Illustrated with the I/O section 32 are the functional blocks into which the section is subdivided.

The CPU section 31 uses a sixteen bit arithmetic logic unit which operates on a 256 byte register file. The two are connected via a sixteen bit data bus and an eight bit address bus. Any of the locations in the register file can be used for sources or destinations for most of the instruction upon which the CPU operates. This type of architecture is known as register to register.

Within the I/O section 32, there are seven major I/O functions. The first is a high speed input (HSI) unit 43 which provides automatic recording of events. The HSI is connected to the interrupt control 44 and the data bus. Second is the high speed output (HSO) unit which provides automatic triggering of events in real time interrupts. Together with the HSI 43, the high speed output is referred to as the HSIO unit. Third is the pulse width modulation (PWM) output 45 which can be used as a digital to analog converter. Fourth is the analog to digital (A/D) converter 46 which has eight mutliplexed inputs with 10 bit resolution. Fifth is the watchdog timer 47 which operates as an internal timer, resetting the system if the software fails to operate properly. Sixth is the serail port 48 which has several modes and its own baud generator, providing synchronous or synchronous links. Finally, there are a series of standard I/O lines designated generally at 49 to provide interface to the external world. Many of the I/O features of controller 30 are designed to operate with little CPU 31 intervention.

Also shown in FIG. 2 are VSS and VCC, the ground/reference and voltage potential source respectively for microcontroller 30.1 VBB is provided for the A/D converter 46 from the back-bias generator. Similarly, VREF and ANGND are provided for A/D converter 46. XTAL1 and XTAL2 are connected to a crystal between the two inputs providing for a clock generator for the microcontroller 30.1.

Watchdog timer 47 is provided to "reset" microcontroller chip 30.1 in the event that the software does not operate properly. In order to avoid resetting, a "word" must be written to watchdog timer 47 once each 24 milliseconds running at 8 MHz. If the "word" is not written within that period, the timer 47 will cause the CPU 31 to reset the microcontroller 30.1 operation. Tied to the line between watchdog timer 47 and CPU 31 is a reset line connected to a circuit (not shown) which detects if the power supply (not shown) is within the allowable voltage range. The reset line is pulled low upon applying power to the controller 30, but goes high to reset the microcontroller 30.1 in the event that the power supply provides a voltage outside of the required range.

Memory controller 50 controls the flow of information between microcontroller 30.1 and its I/O expander chips 58, 59 (described below), EPROM (not shown) and RAM (not shown). The address and data are provided to these peripheral chips in a manner which is well known in the art, so that the process will be only briefly described herein. Memory controller 50 uses ports P3 and P4 to multiplex the appropriate address and data to write, or read, to that address. The address is transmitted to a latch (not shown) and decoder (not shown), with the decoder using the most significant three bits to decode which of eight peripheral chips the informaton is to be "read from/written to". The latch stores the address during this decoding. Once the appropriate chip is determined, the address is provided and the multiplexed data is transmitted/received. Memory controller 50 uses the $\overline{EA}$ to determine whether internal or external memory is being utilized, $\overline{ALE}$ to enable the address latch, $\overline{BHE}$ for decoding, $\overline{RD}$ to read, and $\overline{WR}$ to write.

While not specifically detailed in the figures, it will be understood that the gates, chips and other components are properly connected to appropriate bias and reference supplies so as to operate in their intended manner. Similarly, attendant peripheral chips required for the operation of the several microchips as well as the selection of the various resistors, capacitors and other components will be understood to be similarly properly connected. Finally, although not illustrated, it will be understood that the generator 22 is connected to the load bus 42 to facilitate the generation of three-phase power.

Figure 3:
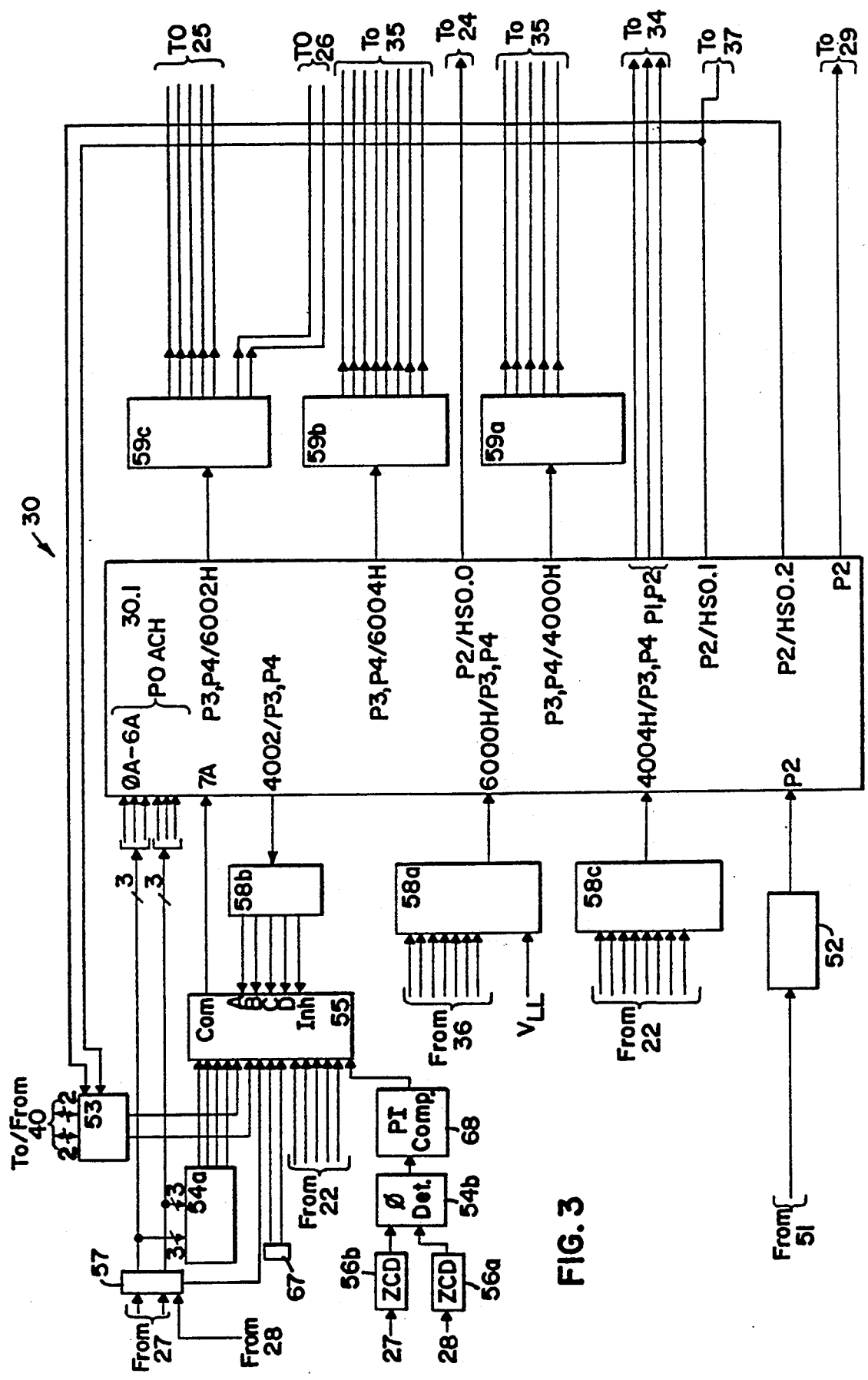
FIG. 3 is a block diagram of the funictional elements of the controller represented by block 30 in FIG. 1.

Referring now to FIG. 3, there is illustrated a functional block diagram of the connection between the microcontroller 30.1, the operator input 36, displays 35 and monitored parameters from the sensors 22 and lines 27 and 28 among others. Beginning first with the connections, magnetic pickup 51 is connectd to the HSIO unit 36 via zero crossing detector 52. The lines from sensors 22 are connected to Port c of an I/O expander chip 58. The inputs from sensors 22 include the idle switch, low coolant, service air cleaner, battery charge, AC contactor closed, and high/low volt connection (which indicates whether generator 22 is connected in a series or parallel winding configuration). The I/O expander chip 58 is connected to the microcontroller 30.1 address and data bus. By reading or writing information to an address corresponding to the port of the I/O expander chip, microcontroller 30.1 receives or provides information from sensors 22 and operator input/output 41 among others. I/O expander chip 58 is used to facilitate greater input and output from microcontroller 30.1 and its use is well known in the art so will not be described further.

Next, there are 8 digital channels from operator inputs 36 connected to Port a of I/O expander chip 58. Port b of I/O expander chip 58 is connected to microcontroller chip 30.1 in a somewhat different fashion than Ports a and c. Port b of I/O expander chip 58 is connected to a 16 channel multiplexer chip 55 via five digital control lines (A through D and inhibit). This arrangement allows microcontroller 30.1 to read sixteen more analog channels to A/D converter section 46 via the common channel of multiplexor chip 55.

Still referring to FIG. 3, the eight A/D channels of converter section 46 are illustrated as ØA through 7A. inputs ØA, 1A and 2A are connected to the three phases of generator 22 via line 27 for measurement of voltage. A/D converter 46 inputs 3A, 4A and 5A are connected to the three phases of generator 22 for measurement of current. Also connected to these three phases of line 24 are phase shift detector circuits 54a. Since controller 30.1 needs to monitor several other analog signals, multiplexer chip 55 is used in connection with Port b of I/O expander chip 58 to selectively monitor these other various inputs. These additional channels comprise the phase shift detector circuit 54 a outputs, inputs from sensors 22, load bus 42 information, voltage and frequency adjustment potentiometer 67, synchronization information from the proportional-integral compensation network 68, and load sharing information from additional gen-sets 40.

As described, also provided to multiplexor chip 55 is input from the synchronization proportional integral compensation network 68 ("PI Comp"). Connected to PI Comp 68 is a phase detector circuit 54b, which is in turn connected to two zero crossing detectors ("ZCD") 56 which receive input on lines 27 and 28 respectively. Also illustrated are precision filter and rectifiers 57. In a preferred embodiment, there are seven such precision filters and rectifiers 57, one for each generator 22 voltage and current phase and one for the load voltage.

Also connected to CPU 30.1 is I/O expander chip 59. This expander chip also has three ports (a, b, and c) of eight lines each and provides digital outputs to the fault displays 35, the engine auxiliaries 25 and the circuit interrupter 26, among others.

There are four HSIO unit 36 outputs used from microcontroller 30.1. These are utilized in the preferred embodiment as pulse width modulators and include a pulse width modulator for the GCM 600, a pulse width modulator for the real load sharing data, provided to block 53, a pulse width modulator for the reactive load sharing data, provided to block 53, and a spare. The module controlling the HSIO 43 is PWMM 800. The output of the resident hardware pulse width modulator 45 is provided to the regulator output stage 29.

In a preferred embodiment, the I/O expander chips are commonly designated as a 8255 chips. The multiplexer chip is commonly designated as a 4067 type chip. An off-chip Erasable Programmable read only memory (EPROM) chip (not shown) is used to store the logic flow program steps to provide for the control system operation. These steps could be stored in a read only memory location or be down loaded to a random access memory location or transmitted by another CPU. The EPROM used is a 2764 type chip manufatured by, among others, Intel.

Third, the description of the several various peripheral circuits will follow.

FIGS. 4 and 5 are schematics of the phase shift detector circuits 54. These include two different circuits, FIG. 4 illustrates the circuit used for power calculation and load sharing and FIG. 5 for synchronization and permissive paralleling.

The simplified power calculation circuit illustrated in FIG. 4 includes two comparators 70a and 70b, each of which produce a 50% duty cycle square wave output with an alternating current (A.C.) voltage input $V_{1in}$ and $V_{2in}$ known in the art. These square wave outputs are combined by an Exclusive OR gate 71 which provides for a high output if one of its inputs are high, but a low input if more than one of its inputs are high. With this arrangement, the duty cycle of the output of the Exclusive OR gate 71, will be proportional to the phase difference of its input signals. The Exclusive OR gate 71 output is filtered by resistor capacitor network 72 which provides the DC voltage level proportional to the phase difference. Therefore, the voltage at point 72a will be larger if the two input signals are out of phase.

The voltage at point 72a, however, will not provide the necessary information to determine whether the current is leading or lagging the voltage. This information is required for the power sharing feature, as well as determining if a reverse power fault condition has occurred (i.e., power is flowing into the gen-set 20 from the load bus 42). Therefore, a D flip flop 73 is also provided to determine whether $V_{1in}$ is leading or lagging $V_{2in}$. The data input to D flip flop 73 is provided by the square wave duty cycle of comparator 70b, while the clock input is provided by comparator 70a. Acting in the well known D flip flop manner, D flip flop 73 either latches a Ø or a 1 at its data input depending on whether $V_{1in}$ is leading or lagging $V_{2in}$ respectively. The latched data is provided to $V_{LL}$ for microcontroller 30.1.

The synchronization phase circuit 54b illustrated in FIG. 5 has as its input two zero crossing detectors 56. The first zero crossing detector has the monitored load bus 42 phase voltage as its input while the second has the regulated generator 22 phase voltage as its input. The zero crossing detectors 56 provide 50% square wave duty cycles. These waves are then provided to the phase detector circuit 54b. The circuit 54b consists of an inverter 75 and two mono-stable devices 76. First, the output square wave from zero crossing detector 56a is inverted in order to shift the zero point of the mono-stable circuit 180 degrees. Normally the output of the mono-stable device would be linear from zero volts at zero degrees, two and one-half volts at 180 degrees, and five volts at 360 degrees. However, since in the preferred embodiment a $-180$ to $+180$ range is desired, a 180 degree phase shift is provided by inverting the signal.

The inverted signal is then provided to a mono-stable device 76a, (commonly designated as a 54HC4538 type device). This mono-stable 76a is connected to provide a long pulse which is positive edge triggered by the inverted pulse train. Providing the clear function to the mono-stable device 76a is a second identical mono-stable device 76b. The second device 76b receives its input from a zero crossing detector 56b for the regulated voltage of the generator 22. The second mono-stable device 76b is set to provide very short durational pulses.

In operation, the first mono-stable device 76a provides a high output signal each time the inverted signal goes high as illustrated in FIG. 5 at times $t_1$ and $t_2$. The mono-stable 76a signal remains high until cleared by the second mono-stable 76b signal as illustrated in FIG. 5 at times $t_3$ and $t_4$. The second signal goes high when the regulated voltage from the generator 22 goes high. In this manner, an output square wave duty cycle is provided to filter 77 from the first mono-stable device 76a. The duty cycle is proportional to the phase difference between the load bus 42 and the gen-set 20.

The square wave duty cycle is then filtered by a buffer and resistor-capacitor network 77 which filters the duty cycle to a DC voltage level. The output of the filter at point 77a is equal to two and one-half volts when the two waves are synchronized with each other, zero volts when the two waves are −180 degrees out of phase, and five volts when the waves are +180 degrees out of phase. Between these points, the voltage varies linearly.

The DC voltage level proportional to the phase difference from point 77a is then provided to the PI compensation network consisting of resistors 78 and 79a, capacitor 79b and Op amp 79c. This network compares the difference between the phase difference DC voltage level and a fixed voltage (in the preferred embodiment, two and one-half volts). In the event of a voltage differential, then the network provides an error signal, including an integral term to provide stability, to controller 30.

The signal from the PI compensation network is transmitted as an analog voltage channel to the micro-controller 30.1. The micro-controller samples the channel, converts the analog signal to a digital signal, and provides the information to the GCM to speed up or slow down the gen-set 20 accordingly.

Figure 6:
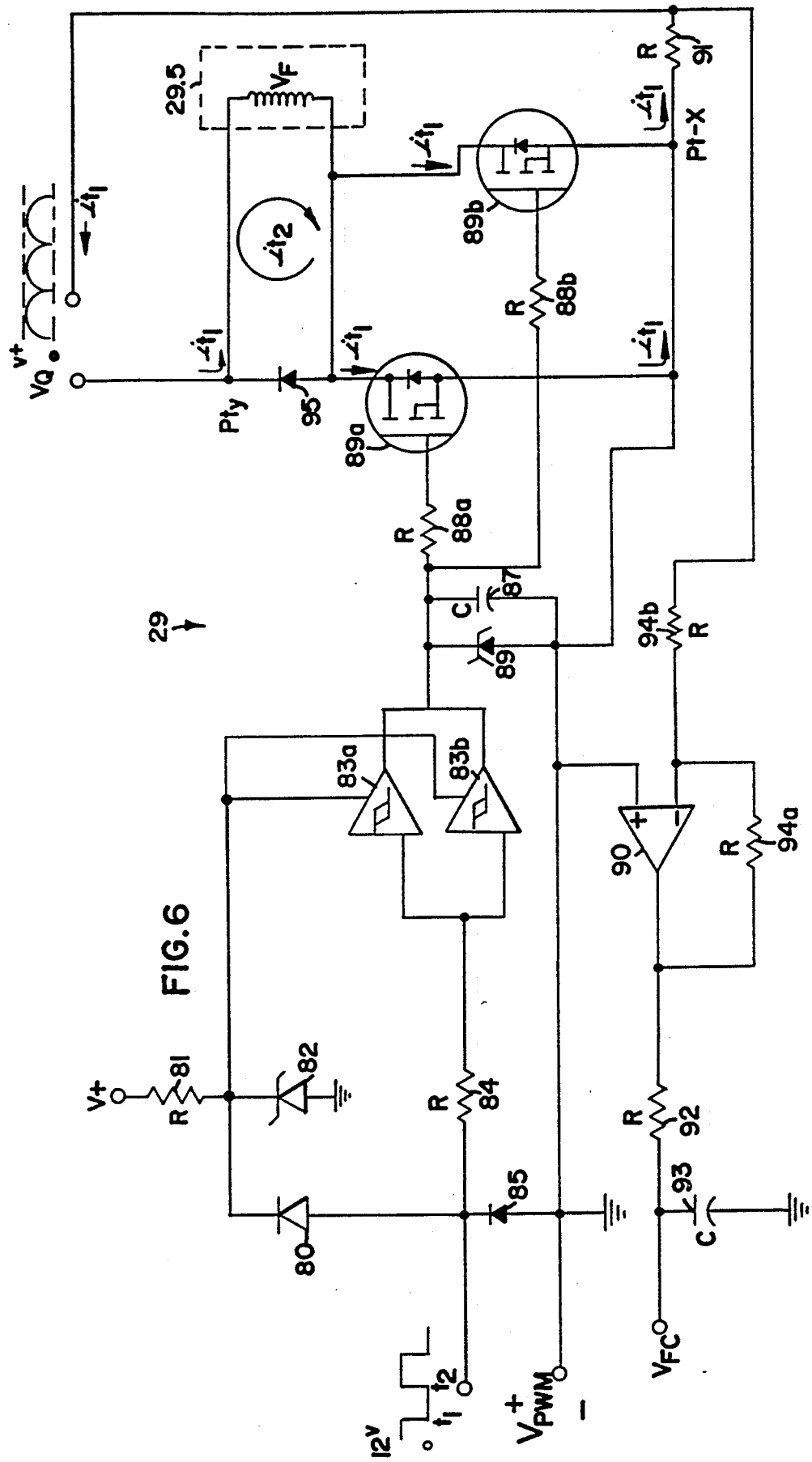
FIG. 6 is a schematic diagram of the automatic voltage regulator power stage represented by block 29 in FIG. 1.

FIG. 6 is a schematic of the AVR power stage 29. Input from the pulse width modulator 45 is connected to a positive voltage potential V+ via a diode 80 and resistor 81. Connected to the cathode of diode 80 is a zener diode 82 with its anode connected to ground. Pulse width modulator 35 is also connected to two C-Mos Schmitt trigger gates 83, designated by part number 40106 and manufactured by Motorola, via resistor 84. This positive line of $V_{pwm}$ is also connected to ground through diode 85. The negative input from PWM 45 is connected to ground and also to diode 85. The trigger gates 83 are connected in parallel and are connected to capacitor 87 and zener diode 89 which are connected in parallel to ground. The trigger gates 83 are then connected through resistor 88 to the gates of two parallel connected MOSFETS 89 with their source connected to common Point X, and drain connected to the field winding. Also connected to ground is an OP Amp 90 connected as an inverting amplifier sensing the voltage across current sense resister 91 located in the current $it_1$ return path. The voltage drop across sense resistor 91 is tied to the inverting input of OP Amp 90 and to feedback resistors 94a and 94b. The output of OP Amp 90 is connected via filter resisor 92 to capacitor 93 and the field current line $V_{FC}$. Capacitor 93 is also connected to ground. Located between a point Y and the drain of MOSFET 89a is diode 95. Connected between points x and y is a rectified quadature winding input $V_o$.

In operation, the power stage 29 operates in the following manner. Microcontroller 31.1 uses pulses width modulator 45 to provide a variable duty cycle to the terminals labeled $V_{pwm}$. Diode 80, resistor 84 and diode 85 are present to suppress transients. The pulse width modulator 45 input is applied to the Schmitt trigger gates 83 to buffer the input signal. The capacitor 87, zener diode 89, and resistors 88 provide for filtering the signal applied to the parallel wired MOSFETS 89. The inverted signal is applied to the MOSFETS 89 such that at time t1 of the applied pulse width modulator 45 signal, the MOSFETS conduct. In the preferred embodiment, MOSFETS 89 conduct at 10 volts. When MOSFETS 89 are conducive, a current $i_{t1}$ is set up through the field winding 29.5, with diode 95 back biased. $V_Q$ is a full wave rectified voltage whose source is the quadature winding of generator 22. At time $t_2$ MOSFETS 89 turn off. Since the winding 29.5 acts as an inductor, the current tends to continue flowing, thereby establishing current $i_{t2}$ in a loop through the field winding 29.5 and diode 95.

Figure 7:
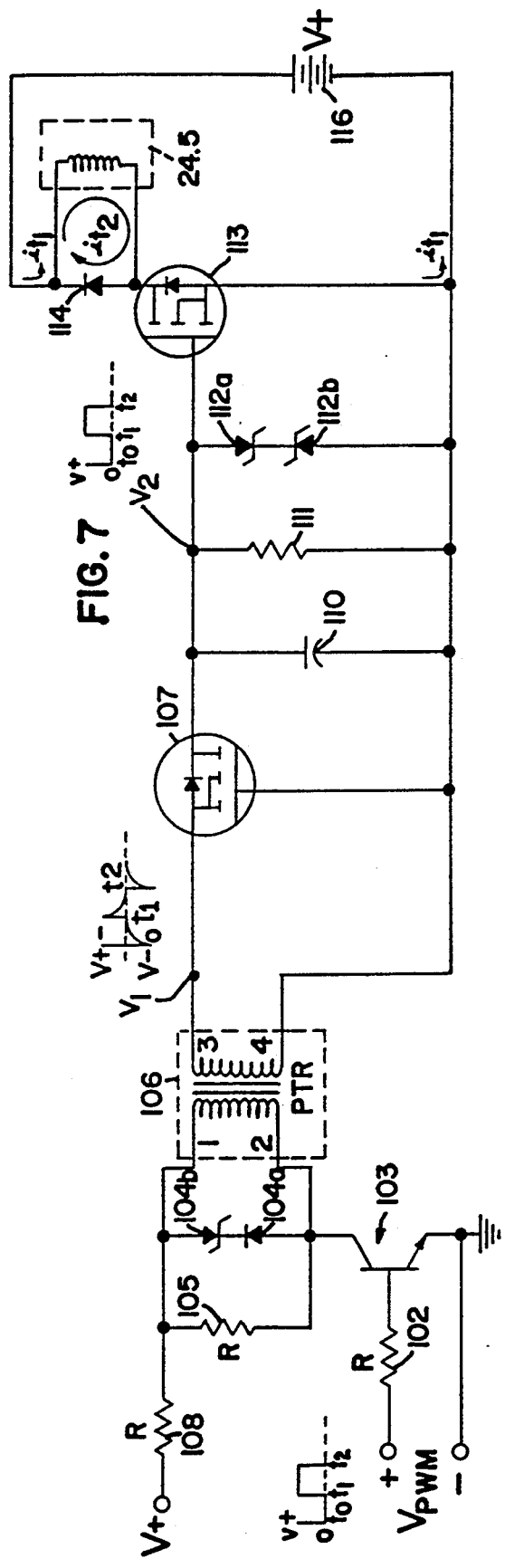
FIG. 7 is a schematic diagram of the governor output power stage represented by block 24 in FIG. 1.

Turning now to FIG. 7, there is illustrated a preferred embodiment of the governor output stage 24 shown in FIG. 1. Input to the governor output stage 24 is transmitted from HS0.0 of microcontroller 31.1. This input, designated $V_{pwm}$ in FIG. 4, is connected to an npn transistor 103 via resistor 102. The transistor's 103 emitter is connected to ground and its collector is connected to a series connected zener diode pair 104. The collector is connected to the series diode pair which is connected in parallel with resistor 105 and pulse transformer 106.

A positive voltage potential source V+ is connected via resistor 108 to zener diode 104b anode. The secondary winding of transformer 106 is connected to the source and gates of power MOSFET 107. Power MOSFET's 107 drain is connected to the parallel connected group of capacitor 110, resistor 111, and cathode to cathode series zener diodes 112 (specifically diode's 112a anode). Power MOSFET 107 is also connected to the gate of power MOSFET 113. MOSFET 113 has its source connected to the gate of MOSFET 107. The voltage source V+ is connected with its anode to MOSFET's 113 source, and cathode to the cathode of diode 114 and to the winding of actuator 24.5 for engine 21.

In operation, microcontroller 30.1 provides a variable duty cycle by using HSIO unit 43 as a pulse width modulator drive. The resulting duty cycle is applied at $V_{pwm}$. The pulse width is applied via biasing resistor 102 to transistor 103 which acts in the classic transistor manner, wherein the transistor is saturated when the input level is high thereby producing a low voltage at its collector, and being cut off when the voltage input is low thereby producing a high voltage at its collector. The voltage source V+ current is limited by resistor 108 when transistor 103 turns on. Resistor 105 dissipates energy stored in the pulse transformer 106. The zener diode pair 104 acts to clamp the voltage after transistor 103 turns off and the pulse transformer 106 flys back.

The output of pulse transformer 106 is indicated at point V1 as a series of pulses decaying exponentially for each change in input voltage $V_{pwm}$. The positive pulse at time $t_1$ is generated by transformer 106 is provided to charge capacitor 110 through the intrinsic diode of MOSFET 107 thereby turning on MOSFET 113.

The pulse $V_1$ decays to zero, but MOSFET 113 stays on due to capacitor 110 being charged. At time $t_2$ transistor 103 turns off allowing pulse transformer 106 to fly back through the combination of resistor 105 and diodes 104. A negative pulse is generated which turns on MOSFET 107, thereby discharging capacitor 110 and turning off MOSFET 113.

The output of MOSFET 107 at its drain is indicated at point $V_2$. The zener diode pair 112 are present to suppress transients. The resulting duty cycle of point $V_2$ is applied to the gate of MOSFET 113 turning MOSFET 113 on and off as described above. Therefore, at time t1 current $i_{t1}$ is established around the loop formed by voltage source 116, actuator 24.5 and MOSFET 113. When MOSFET 113 cuts off, actuator 24.5 acts as an inductor and the current continues to flow around the loop through diode 114 as indicated by $i_{t2}$.

Referring now to FIG. 8, there is illustrated a preferred embodiment zero crossing detector 52 and 56. The voltage waveform applied to the circuit, $V_{in}$, is connected to resistor 118 which is in turn connected to the parallel connected capacitor 119 and diode 120 to ground and to resistor 121. Resistor 121 is connected to the parallel connected diode 122 and resistor 123 to a voltage source V+. The voltage source is connected to the non-inverting input of comparator 129 via resistor 124. Also connected to the non-inverting input of comparator 124 is resistor 128 to a ground/reference potential and hysteresis resistor 127. Hysteresis resistor 127 is connected to the output of comparator 129, $V_{out}$ and V+, to the latter through resistor 125. Resistor 118, 121, 123, 124 and 128 are provided to allow for use of the circuit as a zero crossing detector with a single supply voltage.

In operation, $V_i$ is compared to a voltage by comparator 129 such that when the input voltage is greater than zero volts, the output $V_{out}$ is zero or low. When the input voltage is less than zero, $V_{out}$ is high. The output voltage changes from low to high or high to low each time the input waveform voltage crosses through zero volts. $V_{out}$ is kept from oscillating by adding hysteresis resistor 127.

Referring now to FIG. 9, there is illustrated a preferred embodiment precision rectifier and filter 57. The voltage $V_{in}$ is connected to resistor 130 which in turn connectd to zener diode 131 to ground, resistor 132 to Op amp 134 and feedback resistor 133. The output of Op amp 134 is supplied to the anode of diode 135 which is connected to ground via resistor 136, feedback resistor 133 and resistor 137. The latter is then connected to capacitor 138 to ground and to a unity gain buffer to $V_{out}$.

In operation, the Op amp 134 is connected as an inverting amplifier which is inoperative when $V_{in}$ is positive, the resulting waveform at $V_1$ is proportioned to input waveform $V_{in}$ with resistors 130, 133 and 137 acting as a voltage divider. When $V_{in}$ is negative, Op amp 134 acts as an inverting amplifier. The result at $V_1$ is a full wave rectified voltage. In operation, diode 135 isolates the Op amp 134 during the positive portion of the $V_{in}$ waveform. Resistor 130 and zener diode 131 provide transient protection. The rectified wave is then filtered by the Resistor 137 and capacitor 138 combination. Finally, the filtered wave is buffered by the unity gain buffer 139.

Figure 10:
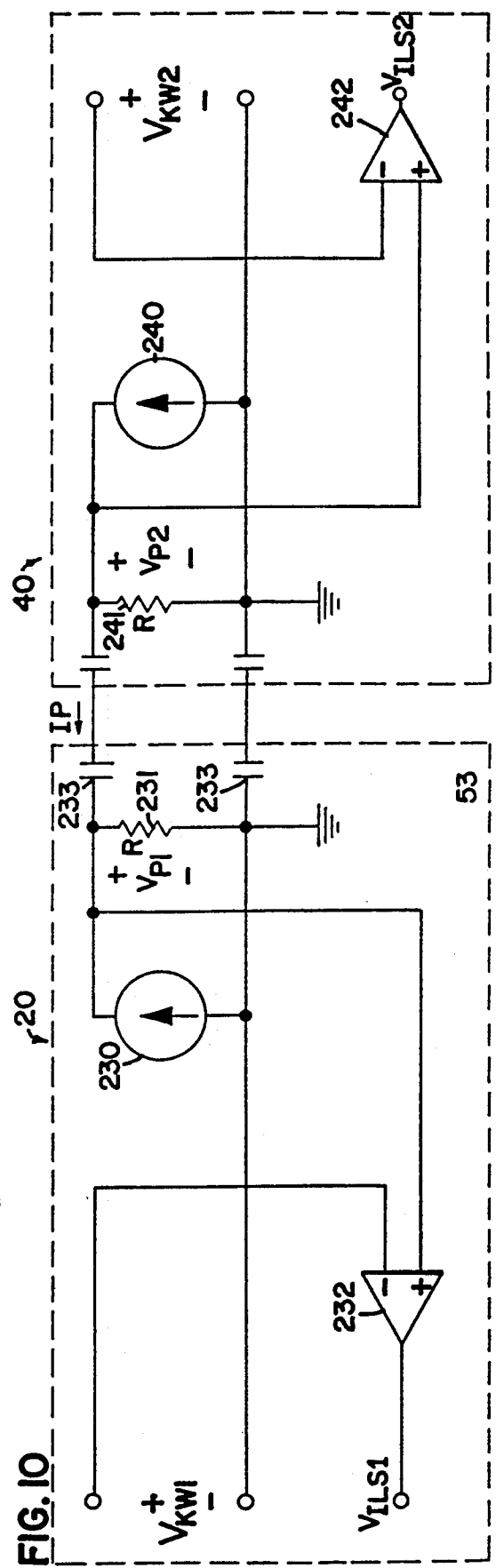
FIG. 10 is an electrical schematic diagram modeling the paralleling circuit represented by block 53 in FIG. 3.

Next referring to FIG. 10, AGS 40 are connected in parallel to the load bus 42, the controller 30 automatically compensates so that each gen-set 20 and additional gen-set 40 shares real power and reactive power. The governor output stage 24 of controller 30 is adjusted to share the real power and automatic voltage regulator 29 is adjusted to share the reactive power. The total power supplied by each gen-set 20, 40, will equal the power multiplied by cosine $\beta$ plus the power multiplied by sine $\beta$; where cosine $\beta$ is the real power and sine $\beta$ is the reactive power. Therefore, to calculate real power, the magnitude of phase A voltage multiplied by the magnitude of phase A current is multiplied by the cosine of the angle between that voltage and current. Similarly, the reactive power is found by taking the phase A voltage times the phase A current multiplied by the sine of the phase difference between the voltage and current. This is provided in a similar fashion for the other two phases. PWRM 200 provides this information to the PWMM 800 for output in a pulse width form for real power meter 37 and to PCM 700 which in turn provides the power information to the VRM 400 and GCM 600 to share power, and to MCM 150 for reverse power fault analysis.

The simplified model of the parallel circuit used in the preferred emboidment is best seen in FIG. 10. The gen-set 20 includes a current source 230 which generates a current which is proportional to the real power for voltage gen-set 20. The input for current source 230 is determined by a square ware duty cycle generated by HSIO 43, which in turn is transmitted informaton from the PWRM 200. In the preferred embodiment, the pulse width modulated input $V_{kw1}$ is proportional to the power. $V_{kx1}$ is filtered to provide a DC voltage level. There is a resistor 231 which is connected directly across the current source. Similarly, there is a corresponding current source 240 and resistor 241 for the AGS 40. The voltage $V_{p1}$ and $V_{p2}$ across resistors 231 and 241, respectively, are provided to differential Op amps 232 and 242 respectively. $V_{kw1}$ is also provided to OP amp 232 and $V_{kw2}$ is provided to Op amp 242. Also provided are relays 233 which are operated by PCM 700, as described below. Generally the relays 233 are closed only after gen-set 20 is in parallel mode, and the gen-set is synchronized with the load bus 42 (i.e., after load sharing has been enabled).

In operation, when the voltages $V_{kw2}$ are the same, current sources 230 and 240 will be producing identical currents. In that instance, the voltages $V_{p1}$ and $V_{p2}$ across the resistors will be identical and there will be no current flow $I_p$ through the parallel cables between gen-set 20 and AGS 40. However, if the load on either gen-set 20, 40 is greater than the load on the other, then a current $I_p$ will be established to provide an equal voltage $V_p$ across the resistor with a smaller current flowing through it from its companion current source. Since $V_{pn}$ will be larger thann $V_{kwn}$ on one set, and smaller on the other, the respective differential Op amps 232, 242 will provide appropriate voltages $V_{ILSN}$ to their respective controllers for processing. As can be readily appreciated by those skilled in the art, in the modeled circuit $V_{ILS}$ will equal $V_p$ less Vhd kw. In order to share both real and reactive power, duplicate circuits are required.

By way of example, if the real load on additional gen-set 40 increased, the voltage $V_{kw2}$ would increase and so would the current generated by current source 240. Since resistors 231 and 241 are in parallel, the voltages across them must be equal. Therefore, current $I_p$ would flow as indicated in FIG. 10 to balance the system. since $V_{p1}$ would be larger than $V_{kw1}$, $V_{ILS1}$ would be positive. Conversely in the given example, $V_{ILS2}$ would be negative.

This $V_{ILS1}$ is signal is provided to the ADM 300 which provides the information to the PM 700. GCM 600 balances the real power by utilizing the information by modifying its reference frequency as described below. At the same time, AGS 40 senses that the voltage across resistor 241 is smaller than $V_{kw2}$. Therefore, this information may be sent to its controller in turn to provide an opposite correction.

In this manner, any number of AGS 40 may be connected to the generator controller 30, in parallel, such that the real and reactive loads will be shared. Further, the parallel function will also operate with existing analog systems using such a parallel model.

Figure 11:
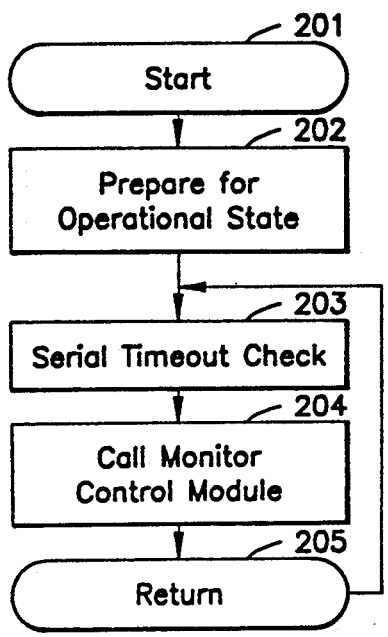
FIG. 11 is a logic flow diagram illustrating the main loop of computer program operation of the gen-set controller 30 in FIG. 1.

Referring again to FIG. 1, as discussed above, within controller 30 is illustrated the information flow between the various modules. The modules represent various operational characteristics of controller 30. In a preferred embodiment constructed according to the principles of the present invention, these modules may be executed utilizing software instructional logic. The logic flow diagram of an embodiment of the program logic which might be resident in system controller 30 is illustrated in FIGS. 11 through 17. FIG. 11 illustrated a logic flow diagram of the steps taken by the controller 30 to cause the gen-set to undergo a change from an inhibit state to an operational state. Next will be a description of the operation process of the gen-set 20 in connection with the several logic flow figures.

After first started at block 201, controller 30 then proceeds to initialize its variable registers and memory at block 202. The controller 30 must initially force the interrupts of the analog to digital converters and the high speed outputs. Also, the SER 34 and HSI 43 must be enabled.

At block 203, after the initialization period, the preferred embodiment performs a serial time-out check. Since the SER 34 is interrupt driven, CPU 31 must check to determine whether the SER 34 buffer should be cleared to enable the buffer to receive a message.

At block 204, controller 30 branches to the engine control monitor routine 150. Upon return from the engine monitor control routine 150, at block 205, controller 30 goes back to serial time-out check block 203 repeat the process. In this manner, the processor 30 continues until interrupted by one of the asynchronous interrupts or the operator either resets or removes power from the controller 30. Even in the inhibited state, the controller 30 continues through this process. The synchronous interrupts occur upon receipt of information by the SER port 34, the pulse width modulator routine for HSIO unit 36, and the HSIO unit 36 for frequency of the rotation of the motor.

Figure 18:
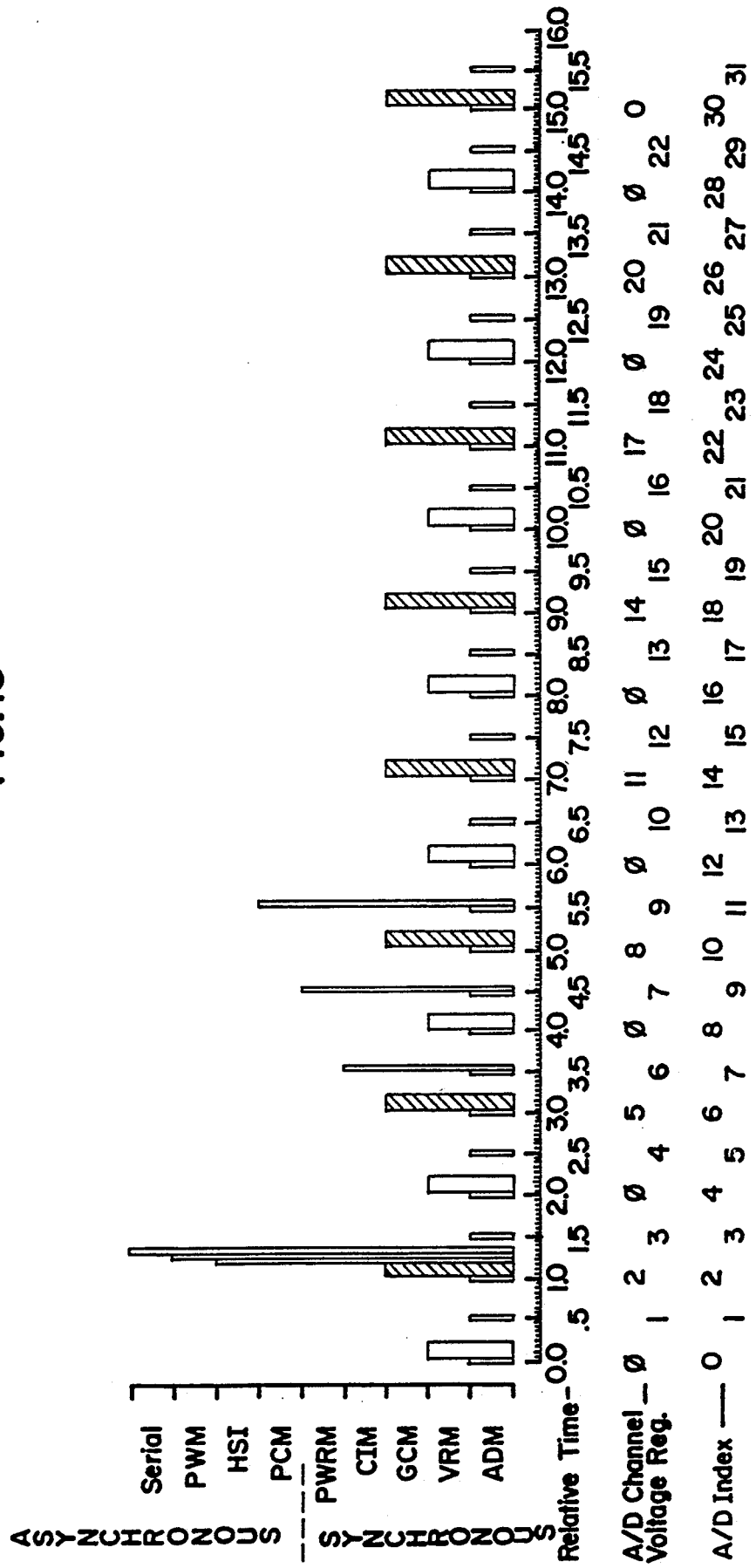
FIG. 18 is graphical representation of the appropriate time required by controller 30 of FIG. 1 to execute the various logical modules and further represents an illustration of the relative time in which the modules may be executed.

Referring now to FIGS. 1 and 19, the asynchronous interrupts will be descrbed in order to further illustrate the operation of gen-set 20. The first asynchronous interrupt is provided by the SER 34 and SER module 48. In the event that a message is received via SER lines 34, then an interrupt signal is generated by interrupt control 44 to handle the incoming communication. An interrupt handling routine (not shown) is jumped to for handling of the serial information. The informaton is handled and controller 30 returns to its place prior to the interrupt. As illustrated in FIG. 18, the time required to run the routine is typically less than 80 microseconds. During initialization, block 201, the communications port 48 is set up by writing a byte to a register indicating the mode in which the port is to be operated.

The second asynchronous interrupt is the pulse width modulation routine for the HSIO 43. This interrupt occurs initially upon being "forced" at initialization block 201. At that time, the HSIO 43 is "told" to interrupt after 3 milliseconds and to turn on at that time (i.e., provide a high output volage state). The module calculates the duty cycle to be transmitted to the engine governor 24, meters 37 and the paralleling signal for both real and reactive power. As illustrated in FIG. 18, the time required to run the routine is typically less than 80 microseconds. The module after calculating the duty cycle writes to the HSIO 43 to turn off after a period of time, but to turn on and interrupt again after 3 more milliseconds. In this manner the module sequentially interrupts the main program every 3 milliseconds.

The third asynchronous interrupt is the HSIO 43 from the magnetic pickup 51. The output of magnetic pickup 51 is a series of voltage pulses. In the preferred embodiment, there are 100 teeth on pickup 51 and the gen-set rotates at 1800 revolutions per minute (30 revolutions per second) in its normal operative state. The HSI 36 generat es an interrupt after every eight pulses or approximately 375 times each second. This corresponds to an interrupt occurring approximately once each 2.67 milliseconds. As illustrated in FIG. 18, the time required to run the routine is typically less than 80 microseconds. The interrupt handling routine (not shown) calculates the period between the last time that the routine was implemented and when the routine was currently called. Once the period is known the frequency may be easily calculated.

Figure 15:
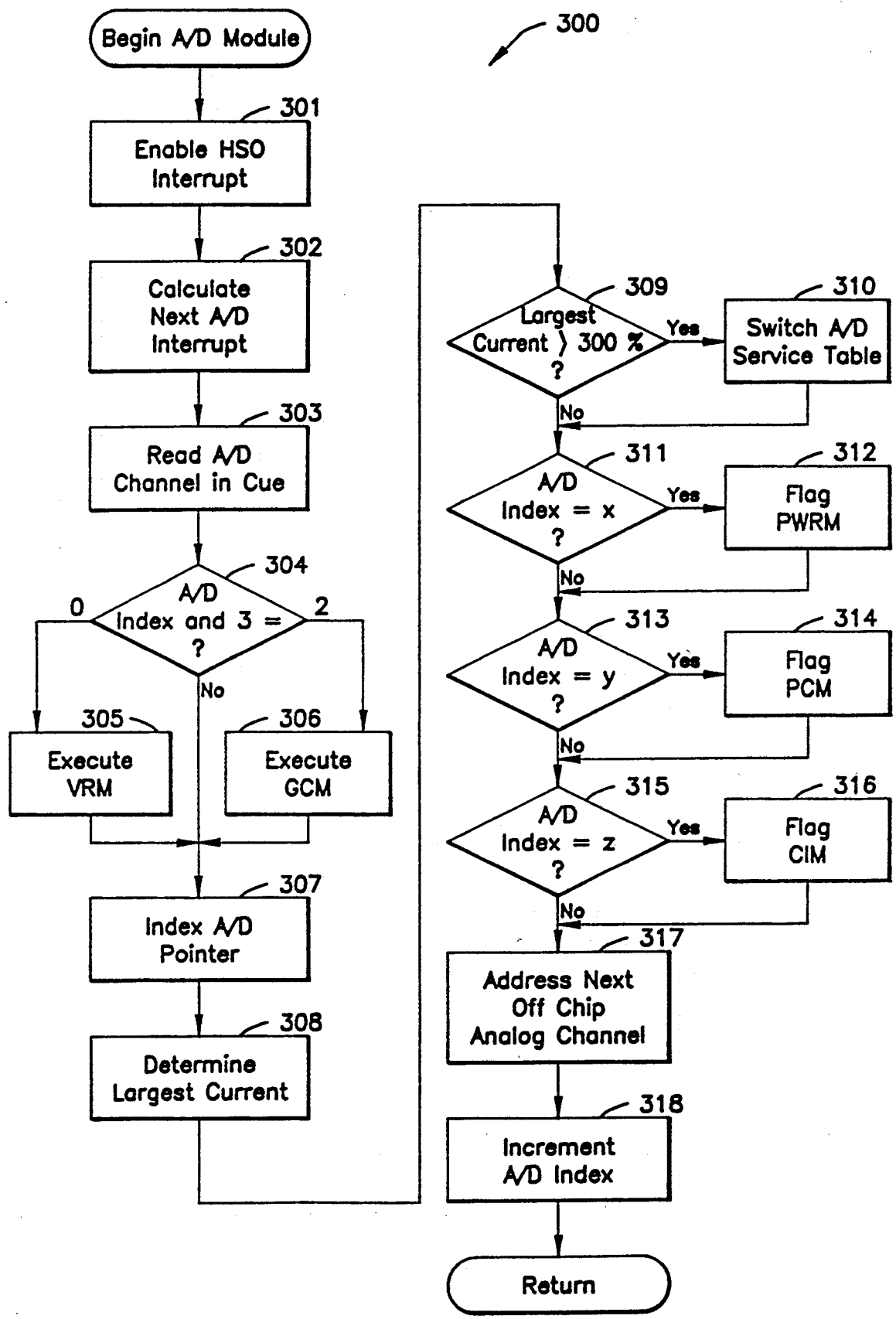
FIG. 15 is a logic flow diagram illustrating the computer program operation of the A/D service routine represented by block 300 in FIG. 1.
Figure 16:
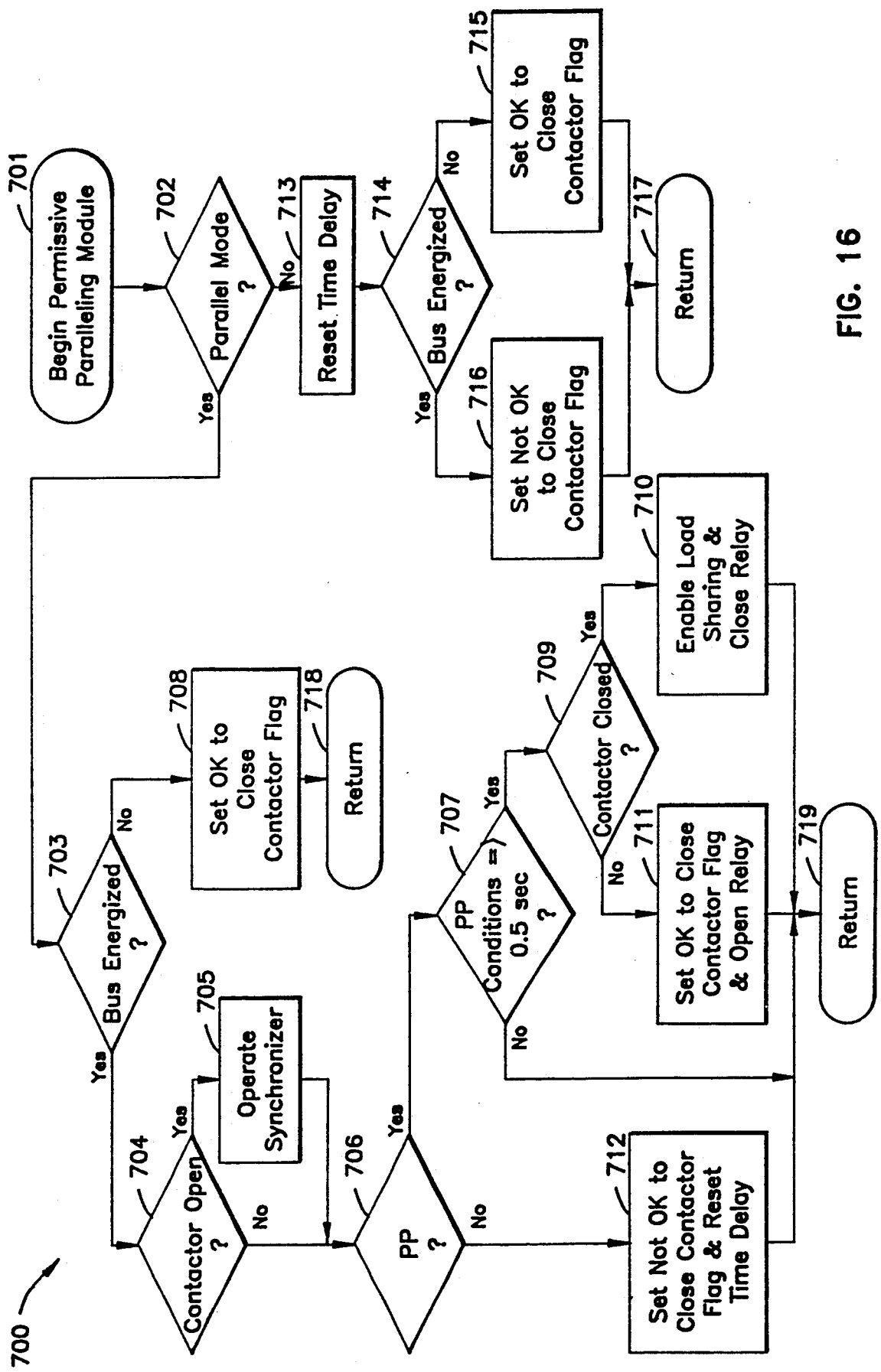
FIG. 16 is a logic flow diagram illustrating the computer program operation of the permissive paralleling control module represented by block 700 in FIG. 1.
Figure 17:
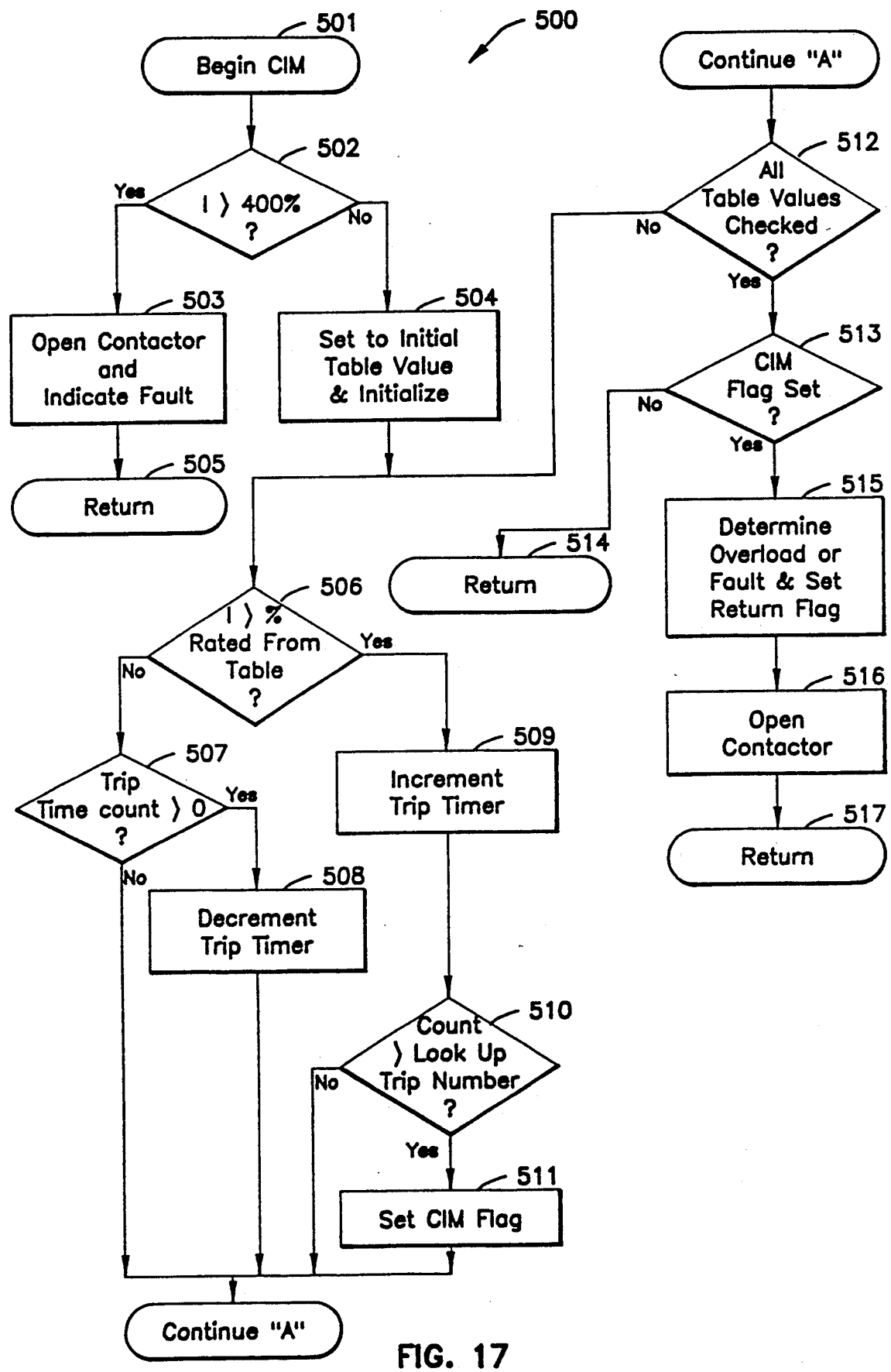
FIG. 17 is a logic flow diagram illustrating the computer program operation of the circuit interrupter module represented by block 500 in FIG. 1.

The analog digital service routine is illustrated in FIG. 15 starting at block 300. At block 301, A/D service routine enables the high speed output 43 interrupt. This is done for two reasons. First, enabling the HSO 43 interrupt provides for a larger pulse width range to the high speed outputs 43, and second, normally in an interrupt routine further interrupts are not allowed so this interrupt must be specifically enabled. Next at block 302, A/D service routine 300 calculates when the next A/D interrupt should occur. At block 303, the next A/D channel in the cue of twenty-three analog channels is read. At block 304, a logical AND is performed between the A/D index and the binary number three to determine whether it equals either zero or two. In the event that it equals zero, the VRM 400 is executed at block 305. However, if the logical operation equals two, the GCM 600 is executed at block 306. In the event that the logical operation results in neither zero or two, then block 307 is executed to increment the A/D pointer to the correct sample table (i.e., one of four available sampling tables illustrated in Table 1). At block 308, the largest currents of the three phases being drawn from generator 22 is determined by looking at the latest current stored. At block 309, the largest current is compared to 300% of the rated current for the gen-set 20. In the event that it is larger than 300%, the A/D service table is changed in order to regulate the largest current being drawn from generator 22. The A/D service table is illustrated as Table 1 below.

TABLE 1

| MICROCONTROLLER SAMPLING SEQUENCE | |
|---|---|
| Volt. Reg. | 0 1 2 3 0 4 5 6 0 7 8 9 0 10 11 12 0 13 14 15 0 16 17 18 0 19 20 21 0 22 0 0 |
| Current Reg. | |
| Line 1 | 3 1 2 0 3 4 5 6 3 7 8 9 3 10 11 12 3 13 14 15 3 16 17 18 3 19 20 21 3 22 0 0 |
| Line 2 | 4 1 2 3 4 0 5 6 4 7 8 9 4 10 11 12 4 13 14 15 4 16 17 18 4 19 20 21 4 22 0 0 |
| Line 3 | 5 1 2 3 5 4 0 6 5 7 8 9 5 10 11 12 5 13 14 15 5 16 17 18 5 19 20 21 5 22 0 0 |

| | | |
|---|---|---|
| 0 - Voltage Phase 1 | 8 - Phase Angle 2 | 15 - VILS - ILS Voltage |
| 1 - Voltage Phase 2 | 9 - Phase Angle 3 | 16 - KVAR - KVAR Sharing Voltage |
| 2 - Voltage Phase 3 | 10 - V Reg Adjust | |
| 3 - Current Phase 1 | 11 - Frequency Adjust 1 | 17 - Spare |

TABLE 1-continued
MICROCONTROLLER SAMPLING SEQUENCE

| | | |
|---|---|---|
| 4 - Current Phase 2 | 12 - Frequency Adjust 2 | 18 - Spare |
| 5 - Current Phase 3 | 13 - Load Side Volts Phase 3 | 19 - Spare |
| 6 - Water in Fuel Voltage | 14 - ∅ Angle Diff. (Phase | 20 - Spare |
| 7 - Phase Angle 1 | 3 Line and Load) | 21 - Spare |
| | | 22 - Spare |

In the event that the largest current is less than or equal to 300%, then A/D service routine 300 compares the A/D index to a constant to determine if the PWRM 200, the paralleling module 700, or the CIM 500 should be executed. This is done by comparing the A/D index to different constants at blocks 311, 313, and 315. In the event that the A/D index is equal to that constant in the associated module, then that module will be executed at blocks 312, 314, or 316. In this manner, one of the three modules will be executed once each time through the 23 A/D channels are read. At block 317, the next off chip analog channel is addressed. Finally, at block 318 the A/D index is incremented and the program returns from the interrupt, generated by the A/D service routine 300, to the point in the logic flow program from which it was interrupted.

MCM 150 is the next basic control program which is executed each pass through the main control loop illustrated in FIG. 11. It controls reading operator input, controlling the circuit interrupter 26 to connect the gen-set 20 to the load bus 42, and it calls the CIM 20, the PWRM 200, the PCM 500, and the check speed sensing module (not shown).

Figure 12:
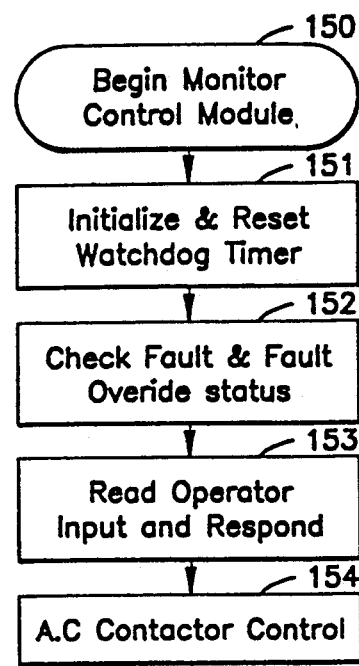
FIG. 12 is a logic flow diagram illustrating the computer program operation represented by block 204 in FIG. 11.

As best seen in FIG. 12, there is a logical flow diagram of an embodiment of the program which might be resident in controller 30. Logic flow diagram 150 illustrates the steps taken to perform the basic control program for the gen-set 20. The program begins at 151 after being called by block 203 branch to monitor control illustrated in FIG. 11. At the start of each pass through the module 150, the watch dog time 47 resident on the microcontroller 30.1 is reset at block 151. At block 152 controller 30 checks for override status for faults and faults to the generator 22 or engine 21. At block 153, MCM 150 looks for operator inputs 36 such as a lamp test/fault reset. In the event a response is called for, then controller 30 sends the appropriate signals. Next at block 154, processor 30 checks for faults and an "O.K. to close" variable from the PCM 700. If both allow, and the operator has closed a circuit interrupter swith (not shown), the circuit interrupter 26 is closed.

At block 155 of logic flow diagram 150, processor 30 checks the status of the circuit interrupter flag. If the flag has been set, processor 30 executes the CIM 500 at block 156. The CIM is described below.

If the flag has not been set, processor 30 continues to check the status of the power calculaton flag at block 157. If the power calculation flag has been set, the PWRM 200 is executed at block 158. The PWRM (logic flow not shown) is executed by use of a lookup table to store the value of the sine β; where β equals angles 0 through 180 degrees. Since the cosine is 90 degrees out of phase, this table may also be used for that calculation, as is well known in the art.

If the module's flag has not been set, processor 30 moves onto check the paralleling flag at block 159. The PCM 700 is described below. If the paralleling flag has been set, the PCM 700 is executed by processor 30 at block 160, and continues to block 161 if the paralleling flag has not been set.

At block 161, the speed flag is checked by processor 30 ad continues to execute the check speed module (not shown) if the flag has been set a block 162. The check speed module reviews the last several values and determines if the gen-set 20 speed is execessive. Processor 30 then returns to the main program loop at block 204 from block 164 after latching faults from the various modules at block 163.

It should be noted that the analog to digital servicing routine 300 interrupts synchronously every one-half millisecond in the preferred embodiment. Further, the circuit interrupter flag, power calculation flag, paralleling flag and speed flag are also synchronous such that those modules are run after a set number of iterations through the ADM 300. In a preferred embodiment, each of the modules are run every 16 milliseconds. Therefore, as illustrated in FIG. 12, when processor 30 executes one of modules at blocks 156, 158, 160, or 162, it would indicate that a certain number of cycles had been performed.

Figure 13:
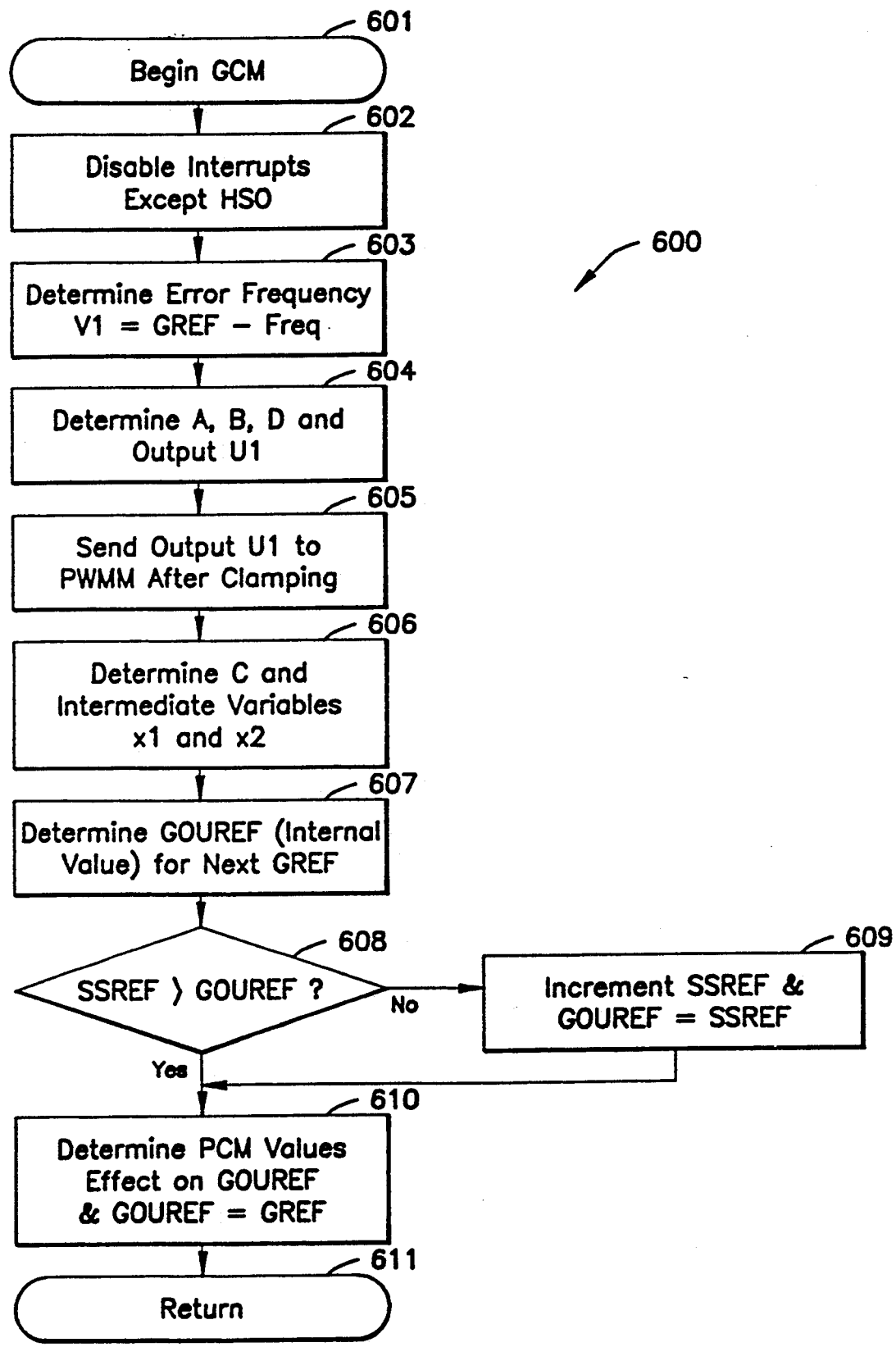
FIG. 13 is a logic flow diagram illustrating the computer program operation of the voltage current regulation module represented by block 400 in FIG. 1.

Illustrated in FIG. 13 is the logic flow diagram for an embodiment of GCM 600. The logic flow diagram illustrates the steps taken to calculate the value sent to the PWMM 800 from the signals received from SSM 350 and PCM 700.

The computer program is shown generally at 600. It is started at block 401 after being called by block 306 of the A/D service routine module 300. First, at block 602, the interruptions are disabled. At block 603, an error frequency, $V_1$, is calculated by subtracting the actual frequency transmitted by SSM 350 from a set reference (GREF). As described above, the GCM 600 uses a three-mode controller, more commonly known as a PID controller for its proportional, integration and derivative terms. Solving for the PID control equation, at block 604 controller 30 determines intermediate results required by the PID algorithm utilized by controller 30 and the output $U_1$. Next at block 605 of logic flow diagram 600, the output calculated at block 604 is compared with maximum and minimum outputs and corrected (clamped) to be within those outputs if it exceeds the same. The output is then sent to PWMM 800 to be transmitted via HSIO 43 to the governor output stage 24. This stage 24 operates as described above and is based on the duty cycle that controls the actuator 24.5 to determine the speed of engine 21.

Continuing to block 606, further intermediate results are calculated. These results are calculated subsequent to clamping $U_1$ and transmitting the value to provide for an output calculation which is more recent in real time to the engine's 21 condition. At block 607, a comparison is made of the base reference frequency to any adjustments made by the operator and is stored as an intermediate value.

At block 608, controller 30 determines if a "soft start routine" is required. If the engine 21 has been in the inhibited state and is now beginning to transmit rotational energy to generator 22 but has not reached the desired frequency of the system, then soft start routine allows for engine 21 to increase its frequency in a more gradual manner without over shooting. To do so, the soft start reference frequency is adjusted in increments each time through the logic flow diagram 600 at block 609 until after a certain number of cycles, the soft start reference is equal to the desired governor reference. At block 610, added to the intermediate governor reference is the parallel offset number generated by parallel PCM 700 for synchronizing the gen-set 20 to the load bus 42 and for sharing real power with additional gen-sets 40. At block 611, GCM 600 ends and returns to the A/D service routine module 300 at block 307 of FIG. 15.

Figure 14A:
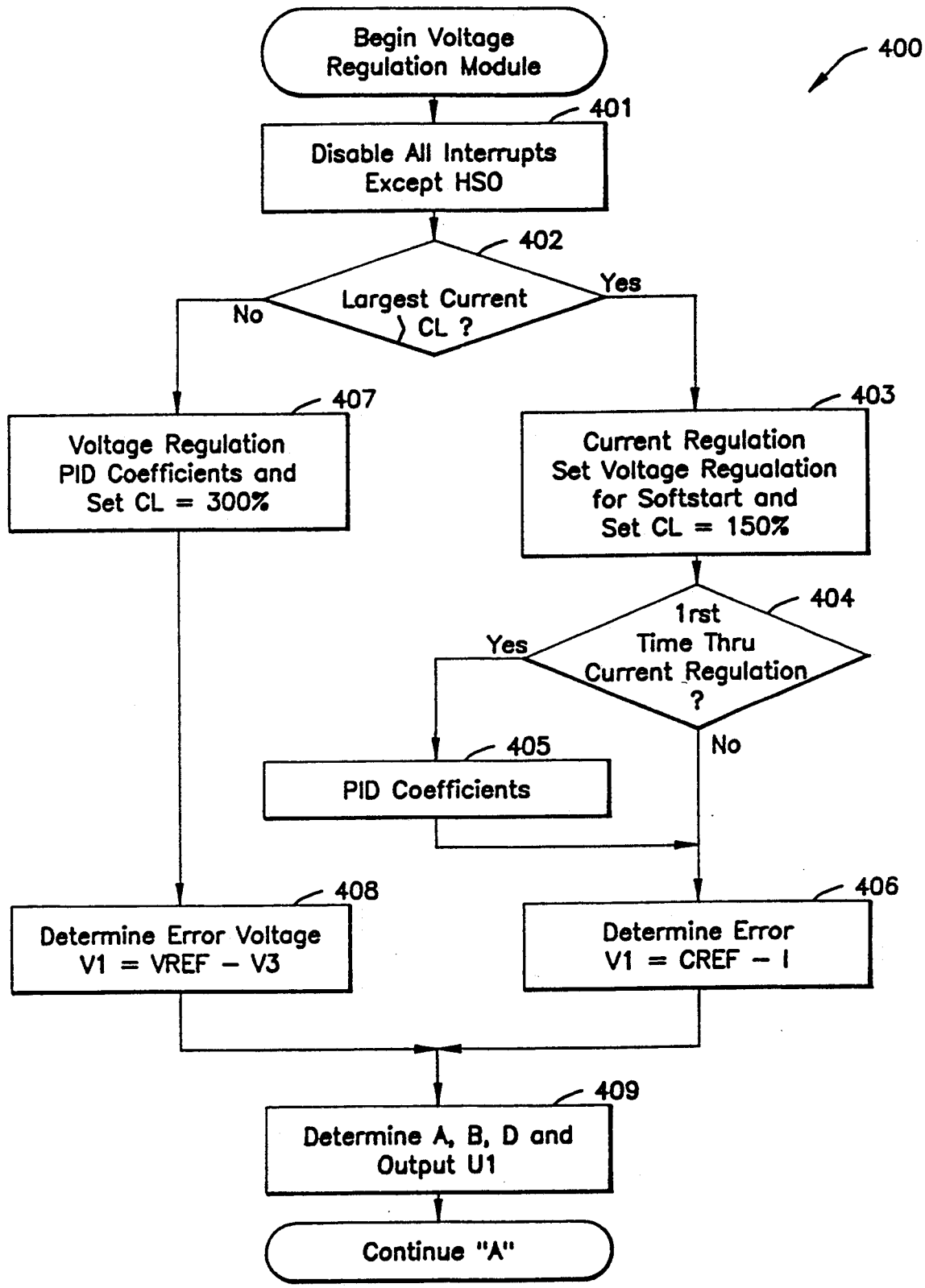
FIG. 14 is a logic flow diagram illustrating the computer program operation of the governor control module represented by block 600 in FIG. 1.
Figure 14B:
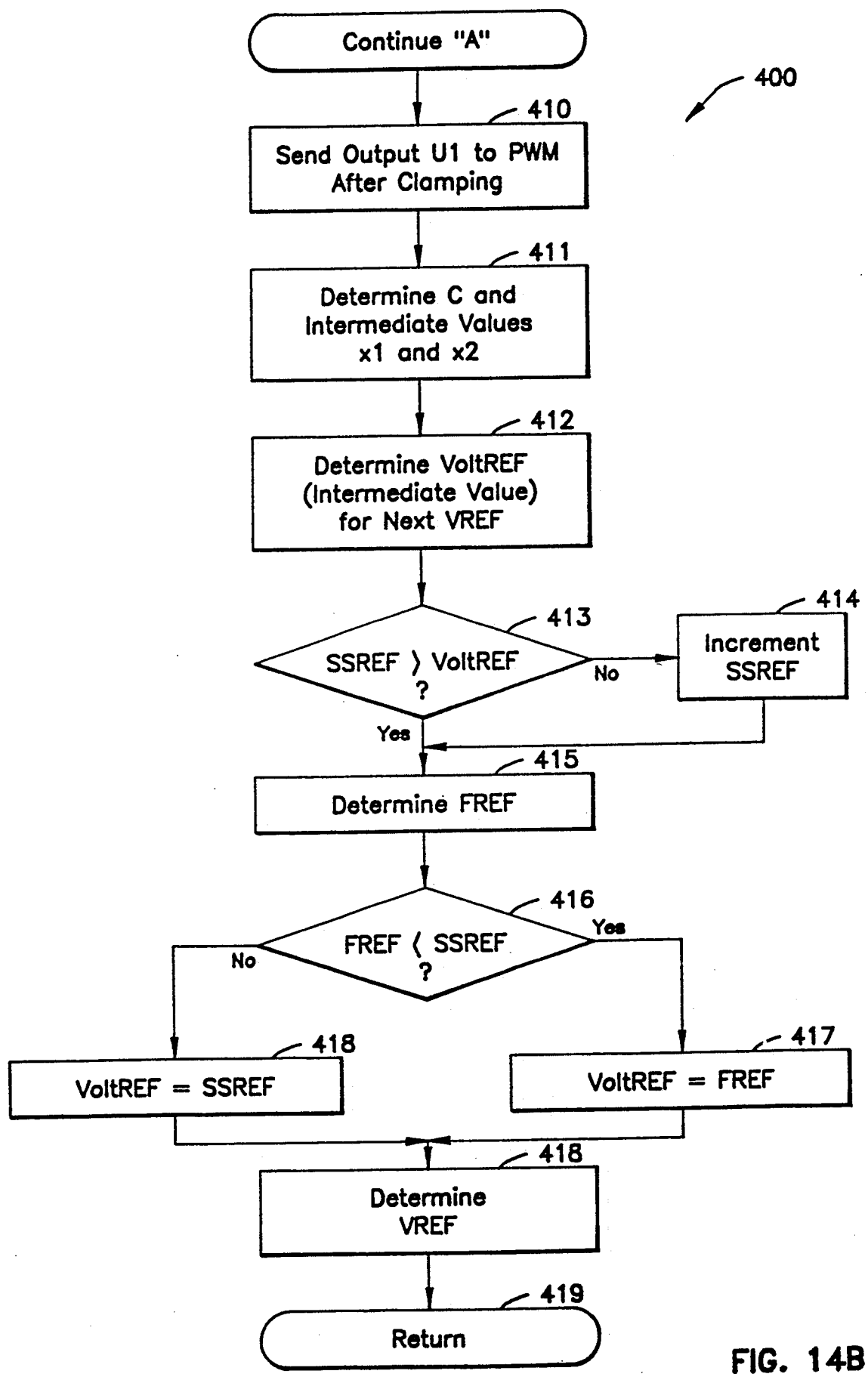

Turning now to FIG. 14, there is illustrated a logic flow diagram of an embodiment of the program module for voltage regulation which might be resident in controller 30. The logic flow diagram 400 illustrates the steps taken to perform the control PID equation for voltage and current regulation. The program 400 is similar to the GCM 600 logic flow diagram, however, instead of using frequency as an input, voltage regulation logic flow diagram 400 uses out phase voltage of generator 22 as an input. As illustrated in FIG. 14 at 401, all interrupts are first disabled except the HSO 43 which has already been enabled at block 301 of FIG. 15 (to provide for a larger pulse width range). Next at 402, the logic flow diagram 500 first makes a determination of whether to regulate voltage or largest current by comparing the current to a preset current limiting reference number. In the preferred embodiment, the current limiting number is 300% of the generator's 22 rated current. This reference number is used to determine if the current regulation mode is required.

If the current is larger than the reference current limit, controller 30 proceeds to block 403 setting the current limit reference number to 150% of the generator's 22 rated current and changing the voltage regulation for soft start. When the current becomes less than or equal to the new current limit reference number, then controller 30 will return to voltage regulation at block 402 as described below. By using different value for the current limit reference number, "hysteresis" is added to the program in order to avoid controller 30 oscillating rapidly between voltage and current regulation in successive iterations through VRM 400. Next at block 404, microprocessor 30 determines if it is the first pass through the current regulation mode. If it is the first time (i.e., first iteration in the current regulation mode), then the coefficients for the controlling PID equation are changed at block 405, to increase the system performance during the current regulation mode. After changing the coefficients, controller 30 proceeds to block 406. If the system has already entered current regulation mode, block 405 is bypassed from block 404 and proceeds directly to block 406. Processor 30, at block 406, then calculates the error signal by subtracting from a reference current the actual magnitude of the regulated current. The result is an intermediate value, $V_1$, which is used in the PID equation. At this point, the current regulation rejoins the main voltage regulation path at block 409.

At block 402, if the current is not larger than the compared reference limit, controller 30 sets current regulation at 300% at block 407 and changes the PID coefficients for voltage regulation. Next at block 408 of logic flow diagram 400, the controller 30 determines the error voltage by subtracting from a reference voltage the actual regulated voltage. The result is $V_1$ which is used in the PID equations at block 409.

At block 409, intermediate values of the PID equation necessary for the algorithm are calculated and the output $V_1$ for the PWMM 850 is determined. Next at block 410, the output is compared to the maximum and minimum pulse widths allowed by pulse width modulator 45 and is limited accordingly (clamped) to be within those maximum and minimum ranges. At block 411, further intermediate values are calculated. At block 412, an intermediate voltage reference is set equal to the stored base voltage plus any operator input voltage level. The VRM 400 has provisions for accepting a digital reading of a voltage adjust pot setting (not shown). It uses this input to adjust the intermediate voltage reference, thereby allowing an operator to adjust the reference voltage without having to enter the software. At block 413, soft start reference voltage is compared to the intermediate voltage reference calculated at block 412. If the soft start reference voltage is less than the voltage reference the soft start reference voltage is incremented at block 414 and controller 30 moves to block 415. However, if the soft start reference voltage is larger than the voltage reference, then the soft start is complete and the soft start reference is not incremented but rather controller moves directly to block 415. The soft start function operates when the gen-set is first started from the inhibit state to the operational state as described above. The reference voltage is started at zero and is then incremented slowly to the base reference voltage (in the preferred embodiment 120 volts). The device operates in this manner in order to provide that the voltage does not overshoot the voltage reference on start-up.

At block 415 processor 30 determines whether there has been a drop in engine speed (frequency). In the event of a frequency drop (e.g., due to a heavy load drawing real power from gen-set 20), processor 30 will also drop the voltage in order to allow the engine 20 speed to regain the appropriate reference speed. In other systems, when a heavy load is placed on the engine, and the engine speed drops, the voltage does not decrease. In some cases causing the engine to lug or stall. However, by dropping the voltage with the engine 20 speed, the load is reduced and the engine 20 is allowed to recover to the appropriate reference frequency. This relationship of reduced voltage to engine frequency is a linear function (e.g., the voltage drops linearly with the frequency). In the preferred embodiment, the voltage is independent of the frequency above 59 Hz. Below 59 Hz, the voltage is decreased linearly by approximately 2 volts per Hz.

At block 416, determination is made whether there has been a drop in frequency and if so whether it is smaller than the soft start reference. The voltage reference is then set equal to the lower of the frequency reference and soft start reference numbers at block 417 and 418 respectively. Processor 30 then continues to block 419 where the next reference voltage is set equal to the lesser of the frequency reference or the soft start reference. Additionally, the parallel offset values received from the PCM 700 are added for reactive land sharing. At block 419, processor 30 then returns to the A/D service routine 300 at block 305 of FIG. 15.

Paralleling control module 700 executed at block 160 of logic flow diaram 150 as illustrated in FIG. 12 is set forth in a logic diagram of an embodiment of the routine logic which might be resident in controller 30. Logic flow diagram 700 illustrates the steps taken to perform a permissive paralleling process between multiple gen-sets. The program starts at block 701 and proceeds to block 702 where it determines if processor 30 is in a single or parallel mode. In a preferred embodiment, this is determined by a physical two pole switch. It the gen-set 20 is in the parallel mode, processor 30 continues to block 703 where it determines whether the load bus 42 is energized. If the load bus is not energized, the controller 30 sets the OK to close contactor flag at block 708 and returns to the MCM 150 at block 161 of FIG. 12. If the load bus is energized, processor 30 then determines if the contactor is open at block 704. If the contactor is open and the load bus 42 is energized, then the synchronizer must be operated prior to closing the contactor. Therefore, at block 705, the synchronizer is operated by determining the value of $x = 2.5 - v_{out}$ where $V_{out}$ is provided by the circuit illustrated in FIG. 5. The resulting value x is supplied to block 610 of FIG. 13 to appropriately speed up or slow down gen-set 20.

If the contactor is closed, controller 30 determines if there is permissive paralleling at block 706. If yes, at block 707, processor 30 then determines whether the gen-set 20 has achieved the permissive parallel standards for a set time period, in the preferred embodiment one-half second. A time delay is required to insure that the gen-set 20 is actually synchronized with the load bus 42 and that they have not merely appeared to be synchronized for an instantaneous period. If it is within range for the set period of time, then a further determination on the status of the contactor is made at block 709. If the contactor is already closed, then at block 710 the load sharing is enabled by subtracting the $V_{ILS}$ from 2.5 volts (the zero point if the sets are balanced) and the paralleling relay 233 are closed. If the contactor is not closed, set the "O.K. to close" contactor flag and open paralleling 233 at block 711. In either event, the program then returns to the MCM 150.

In the event that the permissive paralleling standards are not met at block 708, processor 30 returns to monitor control program at block 719. If there is no permissive paralleling at block 706, then at block 712 the controller 30 sets the not OK to close contactor flag and resets the time delay. Controller 30 then returns to the MCM 150.

At block 702, if the physical switch (not shown) is in the single mode position controller 30 resets the time delay at block 713 in order that if the switch is moved to the parallel position, then the controller 30 is ready to determine whether the permissive paralleling conditions have been satisfied. Controller 30 then continues to block 714 where processor 30 determines whether the bus is energized. If the bus is not energized, then the "OK to close" contactor flag is set at block 715 and processor 30 returns to the monitor control program at 717. If there is a voltage potential on the bus and the processor 30, at block 716, sets the not OK to close contactor flag and returns to the monitor control program 150 at block 717.

CIM 500 is called at block 156 of MCM 150 in FIG. 12. A logic block diagram set forth in FIG. 17 which encompasses logic which may be resident in controller 30 for CIM 500.

Controller 30 begins the CIM 500 at block 501 and moves to block 502 to determine whether the largest current being drawn from generator 22 exceeds 400 percent of the rated current for gen-set 20. In the event, that the largest current is greater than 400 percent, then controller 30 moves to block 503 to open the interrupter and to indicate a fault to operator displays 35. Controller 30 then returns to MCM 150 at block 505. However, if the current is not larger than 400 percent of the rated current for gen-set 20, then at block 504, a CIM variable is set to an initial look-up table value and a second variable, called trip timer count, is initialized. Next, at block 506, controller 30 determines if the load current is larger than the percent rated value from the look-up table for the corresponding trip count. If it is not, the controller 30 goes to block 507 to determine if the trip timer count is greater than zero. If it is not, controller 30 proceeds to block 512. If the trip time count is greater than zero, however, controller 30 goes to block 508 to decrement the trip count timer. Back at block 506, if the current is larger then the percent rated from the look-up table, then controller 30 proceeds to block 509 and increments the trip count timer. Next, at block 510, if the count in the look-up table is greater than the trip number stored in the look-up table, then the CIM flag is set at block 511. However, at block 510 where the count is compared to the trip number, if the count is not larger than the trip number, then controller 30 continues to block 512. Finally, at block 512, controller 30 determines if all table values have been checked. If not, then controller 30 returns to block 506 and repeats the process of going through blocks 506 through 512 until each of the look-up table values have been checked.

In this manner, the CIM 500 iteratively looks at each table value in order to determine if the curent has been higher than the rated time-current relationship for gen-set 20 as illustrated in FIG. 19. It does so by incrementing the trip count timer for each iterative pass through the CIM 500 loop where the current is greater than the percent value rated from the look-up table. If the trip timer is incremented a set number of times, such that it exceeds the look-up trip number for that pass through the loop, then the CIM flag will be set at block 511.

On the other hand, when the current is not larger than the percent rated from the look-up table at block 506, then the trip count timer is decremented for those values, so long as it is greater than zero, and the CIM flag will not be set, unless it has previously been set.

Proceeding from block 512 after each table value has been checked, controller 30 determines if the CIM flag has been set at block 513. If it has not been set, then controller 30 returns to the MCM at block 514. However, if the flag has been set, then controller 30 determines if an overload or short circuit has occurred and sets the overload or short circuit return flag accordingly. At block 516, the contactor 26 is opened. Finally, at block 517, controller 30 returns to MCM 150.

Althrough the controller 30 has been characterized by such terms as preceding, returning and moving, those skilled in the art will appreciate that these terms are used to describe the operation of controller 30 while processing the various programming steps illustrated by the various logic flow diagrams.

It is to be understood that even though numerous characteristics and advantages of the present invention have been set forth in the foregoing description, together with details of the structure and function of the invention, the disclosure is illustrative only and changes may be made in detail, especially in matters of the regulation of different phases of the generator 22, the use of synchronous or a synchronous interrupts for the various modules, the method and order of sampling the various system parameters, the use of positive or negative logic, and the supporting hardware and software routines and data structures, to the full extent indicated by the broad general meaning of the terms in which the appended claims are expressed.

What is claimed is:

1. A control system for controlling the voltage and current output signals of a generator, comprising:
   (a) first sensing means, operatively connected to the generator, for sensing the voltage and current output signals of the generator and for providing a sensed voltage signal and a sensed current signal; and
   (b) first control means, operatively connected to the generator and to said first sensing means to receive said sensed voltage and current signals, for selectively controlling the voltage or current output signals of the generator in response to the magnitude of the current output signal, said first control means controlling the voltage or current signals according to a control process equation having coefficients, wherein the coefficients of said control process equation are changed according to whether the voltage or current signals are being controlled.

2. The control system in accordance with claim 1, wherein said first control means selectively control the voltage and current output signals in real time.

3. The control system in accordance with claim 2, wherein said first control means controls the voltage output signal, selectively controlling the current output signal when the magnitude of the current output signal exceeds a first current threshold level.

4. The control system in accordance with claim 3, wherein said first control means selectively returns to control the voltage output signal when the magnitude of the current output signal is less than a second current threshold level, whereby hysteresis is added to said first control means.

5. The control system in accordance with claim 4, wherein said first control means further includes a microprocessor.

6. The control system of claim 1, wherein said control process equation is implemented by the equations:

$$A = (K_1)(V_1)$$

$$B = (K_2)(X_2)$$

$$C = (K_3)(X_2)$$

$$D = (K_4)(X_2)$$

$$X_2 = X_1 + A$$

$$X_2 = A + B + C$$

$$U_1 = A + B - D$$

wherein A, B, C, D, $X_1$ and $X_2$ are six variables defined to store intermediate results, $U_1$ equals the output of said control process equation and $K_1$, $K_2$, $K_3$ and $K_4$ comprise a set of control process equation coefficients.

7. The generator set of claim 1, wherein said control process equation is implemented by the equations:

$$A = (K_1)(V_1)$$

$$B = (K_2)(X_2)$$

$$C = (K_3)(X_2)$$

$$D = (K_4)(X_2)$$

$$X_1 = X_1 + A$$

$$X_2 = A + B + C$$

$$U_1 = A + B - D$$

wherein A, B, C, D, $X_1$ and $X_2$ are six variables defined to store intermediate results, $U_1$ equals the output of said control process equation and $K_1$, $K_2$, $K_3$ and $K_4$ comprise a set of control process equation coefficients.

8. The method of claim 1, wherein said controlling step comprises implementing said control process equation with the equations:

$$A = (K_1)(V_1)$$

$$B = (K_2)(X_2)$$

$$C = (K_3)(X_2)$$

$$D = (K_4)(X_2)$$

$$X_1 = X_1 + A$$

$$X_2 = A + B + C$$

$$U_1 = A + B - D$$

wherein A, B, C, D, $X_1$ and $X_2$ are six variables defined to store intermediate results, $U_1$ equals the output of the algorithm and $K_1$, $K_2$, $K_3$ and $K_4$ comprise a set of control process equation coefficients.

9. A control system for controlling the voltage and current output signals of a generator, comprising:
   (a) first sensing means, operatively connected to the generator, for sensing the voltage and curent output signals of the generator and for providing a sensed voltage signal and a sensed current signal; and
   (b) first control means, operatively connected to the generator and to said first sensing means to receive said sensed voltage and current signals, for selectively controlling the voltage or current output signals of the generator in response to the magnitude of the current output signal, wherein said first control means controls the voltage output signal and selectively controls the current output signal when the magnitude of the current output signal exceeds a first current threshold level and wherein said first control means selectively returns to control the voltage output signal when the magnitude of the current output signal is less than a second current threshold level, whereby hysteresis is added to said first control means, said first control means comprises a microprocessor including:
      (i) control equation memory means for storing a control process equation;
      (ii) co-efficient memory means for storing a plurality of co-efficient sets corresponding to selectively controlling the voltage output signal, defining a first set of co-efficients, and for controlling the current output signal, defining a second set of co-efficients;
      (iii) data processing means including:

(A) means for computing said control process equation where said sensed voltage output signal is the input;

(B) means for changing the coefficients of said control process equation to said second set when the magnitude of the current output signal exceeds said first current threshold level;

(C) means for computing said control process equation where said sensed current output signal is the input; and (D) means for changing the coefficients of said control process equation to said first set when the magnitude of the current output signal is less than said second current threshold level.

10. A generator set, of the type having a generator powered by a prime mover for connection to a load conductor, comprising:

(a) a generator;

(b) prime mover means cooperatively connected to said generator for transmitting rotational energy to said generator;

(c) first sensing means, operatively connected to said generator, for sensing the voltage and current output signals of said generator and for providing a sensed voltage signal and a sensed current signal;

(d) first control means, operatively connected to said generator and to said first sensing means to receive said sensed voltage and current signals, for selectively controlling the voltage or current output signals of said generator in response to the magnitude of the current output signal, said first control means operatively controlling the voltage or current output signals in accordance with a control process equation, wherein a first set of coefficients are utilized when controlling voltage and a second set are utilized when controlling current;

(e) second sensing means, cooperatively connected to said prime mover means, for providing a sensed rotational speed signal of said prime mover means corresponding to the output waveform frequency of said generator; and (f) second control means, cooperatively connected to said prime mover means and to said second sensing means to receive said sensed rotational speed signal, for controlling the rotational speed of said prime mover means, whereby the generator output waveform frequency and either the current output signal or voltage output signal are simultaneously controlled.

11. The generator set of claim 10, further comprising synchronization means, cooperatively connected to said first sensing means, said second control means, and the load conductor, for synchronizing the generator output waveform to a waveform present on the load conductor.

12. The generator set of claim 11, wherein said synchronization means includes;

(a) waveform detection means, cooperatively connected to said generator and the load conductor, for providing signals responsive to the zero crossing points of said generator and load conductor waveforms;

(b) duty cycle means, cooperatively connected to said waveform detection means, for establishing a pulse train signal having a duty cycle proportional to the offset between the generator waveform and the load conductor waveform; and (c) averaging means cooperatively connected to said duty cycle means and said second control means, for providing an average voltage level of said established pulse train signal to said second control means, wherein said second control means adjusts the rotational speed of the said prime mover to synchronize the generator output waveform to the waveform present on the load conductor using proportional integral control.

13. The generator set of claim 12, wherein said first and second control means includes a microprocessor.

14. The generator set of claim 10, wherein said first and second control means includes a microprocessor.

15. The generator set of claim 14, wherein said generator is connected to the load conductor and further includes:

(a) a contactor in line between said generator and the load conductor, said contactor cooperatively connected to said microprocessor; and (b) third sensing means, cooperatively connected to the load conductor, for sensing the voltage on the load conductor and for providing a sensed voltage signal, wherein said microprocessor establishes said contactor in an open position until permissive paralleling conditions have been satisfied, wherein permissive paralleling conditions include synchronization to a waveform present on the load bus.

16. The generator set of claim 10, wherein said first and second control means includes a microprocessor, and further including power sharing means, cooperatively connected to said microprocessor, for generating a signal representative of the power being delivered by the generator and for receiving a power signal indicative of the power being delivered by a second generator connected to the load bus, wherein the microprocessor receives said created power signal and tends to equalize said power delivered by said generator and the second generator by adjusting the speed of said prime mover or excitation of said generator.

17. The control system in accordance with claim 7, wherein said first and second control means includes a microprocessor and wherein said microprocessor ramps the rotational speed and the output voltage signal when going from an inhibited to an operative state.

18. A method of automatically controlling the voltage and current output system of a generator, comprising the steps of:

(a) sensing the voltage and current output signals of the generator;

(b) providing a sensed voltage signal and a sensed current signal;

(c) receiving said sensed voltage and current signal;

(d) controlling selectively the voltage or current output signals of the generator in response to the magnitude of the current output signal utilizing a control process equation having coefficients; and (e) changing the coefficients of the control process equation based upon whether voltage or current is being controlled.

* * * * *

UNITED STATES PATENT AND TRADEMARK OFFICE
CERTIFICATE OF CORRECTION

PATENT NO. : 5,006,781

DATED : April 9, 1991

INVENTOR(S) : MARK H. SCHULTZ et al.

It is certified that error appears in the above-identified patent and that said Letters Patent is hereby corrected as shown below:

```
Column 1, line 37, for "component" read --components--.
Column 1, line 41, for "typiclly" read --typically--.
Column 1, line 47, for "discete" read --discrete--.
Column 1, line 61, for "function" read --functions--.

Column 2, line 27, for "memroy" read --memory--.
Column 3, line 1, for "biliineal" read --bilineal--.
Column 3, line 2, for "equation" read --equations--.
Column 3, line 3, for "equation" read --equations--.
Column 3, line 47, for "equation" read --equations--.
Column 3, lines 57 and 58, for "paremeters" read --parameters--.
Column 4, line 10, for "cuurrents" read --currents--.
Column 4, line 30, for "Beside" read --Besides--.
Column 5, line 25, for "gen-set" read --gen-sets--.
Column 5, line 25, for "featuure" read --feature--.
Column 6, line 15, for "funcitional" read --functional--.
Column 7, line 25, for "rotaional" read --rotational--.
Column 7, line 41, for "diagram" read --diagrams--.
Column 7, line 43, for "First ," read --First,--.
Column 8, line 6, for "line" read --lines--.
Column 8, line 22, for "provided" read --provides--.
Column 8, line 24, for  "FCM" to read --GCM--.
Column 8, line 38, for "The" read --This--.
Column 8, line 39, for "dicated" read --dictated--.
Column 8, line 56, for "then" read --the--.
Column 8, line 67, for "operare" read --operator--.
Column 9, lines 22 and 23, for "microcroncontroller" read --microcontroller--.
Column 9, lines 31 and 32, for "instruction" read --instructions--.
Column 9, line 48, for "serail" read --serial--.
Column 9, lines 49 and 50, for "synchronous" read --asynchronous--.
Column 10, line 30, for "figures" read --FIGURES--.
Column 11, line 5, for "multiplexor" read --multiplexer--.
```

UNITED STATES PATENT AND TRADEMARK OFFICE
CERTIFICATE OF CORRECTION

PATENT NO. : 5,006,781

DATED : April 9, 1991

INVENTOR(S) : MARK H. SCHULTZ et al.

It is certified that error appears in the above-identified patent and that said Letters Patent is hereby corrected as shown below:

```
Column 11, line  8, for "inputs" read --Inputs--.
Column 11, line 18, for "54 a" read --54a--.
Column 11, line 24, for "multiplexor" read --multiplexer--.
Column 11, line 50, after "as" delete "a".
Column 13, line 45, for "resister" read --resistor--.
Column 13, line 49, for "resisor" read --resistor--.
Column 13, line 56, for "pulses" read --pulse--.
Column 13, line 68, for "conducive" read --conductive--.
Column 14, line 21, for "gates" read --gate--.
Column 15, line 46, for "Resistor" read --resistor--.
Column 16, line 10, for "ware" read --wave--.
Column 16, line 14, for "V_{kx1}" read --V_{kw1}--.

Column 16, line 37, for "thann" read --than--.
Column 16, line 42, for "Vhd kw." read --V_{kw}--.

Column 16, line 53, after "V_{I1S1}" delete "is".

Column 16, line 54, for "PM" read --PCM--.
Column 17, line  7, for "illustrated" read --illustrates--.
Column 17, line 12, for "figures" read --FIGURES--.
Column 17, line 28, after "203" insert --to--.
Column 17, line 33, for "synchronous" read --asynchronous--.
Column 17, line 38, for "descrbed" read --described--.
Column 18, line 17, for "generat es" read --generates--.
Column 18, line 25, after "the" insert --time--.
Column 19, line 41, for "time" read --timer--.
Column 19, line 50, for "swith" read --switch--.
Column 19, lien 57, for "calculaton" read --calculation--.
Column 20, line 13, for "ad" read --and--.
Column 20, line 14, for "a" read --at--.
Column 22, line 67, for "diaram" read --diagram--.
Column 22, line 68, after "logic" insert --flow--.
```

UNITED STATES PATENT AND TRADEMARK OFFICE
CERTIFICATE OF CORRECTION

PATENT NO. : 5,006,781

DATED : April 9, 1991

INVENTOR(S) : MARK H. SCHULTZ et al.

Page 3 of 3

It is certified that error appears in the above-identified patent and that said Letters Patent is hereby corrected as shown below:

Column 23, line 7, for "It" read --If--.
Column 24, line 31, for "curent" read --current--.
Column 24, line 54, for "Althrough" read --Although--.
Column 24, line 67, for "a synchronous" read --asynchronous--.
Column 25, line 47, for "$B=(K_2)(X_2)$" read --$B=(K_2)(X_1)$--.
Column 25, line 53, for "$X_2=X_1+A$" read --$X_1=X_1+A$--.
Column 25, line 63, for "1" read --9--.
Column 25, line 67, for "$B=(K_2)(X_2)$" read --$B=(K_2)(X_1)$--.
Column 26, line 15, for "1" read --18--.
Column 26, line 21, for "$B=(K_2)(X_2)$" read --$B=(K_2)X_1)$--.
Column 26, line 39, for "curent" read --current--.

Signed and Sealed this

Twentieth Day of April, 1993

Attest:

MICHAEL K. KIRK

*Attesting Officer*   Acting Commissioner of Patents and Trademarks